United States Patent
Gella et al.

(10) Patent No.: US 10,089,983 B1
(45) Date of Patent: Oct. 2, 2018

(54) THIRD PARTY ACCOUNT LINKING FOR VOICE USER INTERFACE

(71) Applicant: Amazon Technologies, Inc., Seattle, WA (US)

(72) Inventors: Ganesh Kumar Gella, Redmond, WA (US); Venkata Abhinav Sidharth Bhagavatula, Seattle, WA (US); Robert William Serr, Kirkland, WA (US); Yonnas Getahun Beyene, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/617,604

(22) Filed: Jun. 8, 2017

(51) Int. Cl.
*G10L 15/00* (2013.01)
*G10L 15/22* (2006.01)
*G10L 15/32* (2013.01)

(52) U.S. Cl.
CPC ............. *G10L 15/22* (2013.01); *G10L 15/32* (2013.01)

(58) Field of Classification Search
CPC ......... G06F 17/20; G10L 15/30; G10L 15/34; G10L 15/265
USPC ...................................................... 704/275
See application file for complete search history.

(56) References Cited

U.S. PATENT DOCUMENTS

| | | | | |
|---|---|---|---|---|
| 2008/0040099 A1* | 2/2008 | Wu | ...................... | G06F 17/275 704/9 |
| 2008/0288252 A1* | 11/2008 | Cerra | ...................... | G10L 15/30 704/244 |
| 2010/0070268 A1* | 3/2010 | Sung | ...................... | G10L 15/24 704/203 |
| 2017/0047061 A1* | 2/2017 | Koll | ...................... | G06F 17/276 |

* cited by examiner

Primary Examiner — Daniel Abebe
(74) *Attorney, Agent, or Firm* — Price Atwood LLP

(57) ABSTRACT

Methods and systems for adding functionality to an account of a language processing system where the functionality is associated with a second account of a first application system is described herein. In a non-limiting embodiment, an individual may log into a first account of a language processing system and log into a second account of a first application system. While logged into both the first account and the second account, a button included within a webpage provided by the first application may be invoked. A request capable of being serviced using the first functionality may be received by the language processing system from a device associated with the first account. The language processing system may send first account data and the second account data to the first application system to facilitate an action associated with the request, thereby enabling the first functionality for the first account.

20 Claims, 8 Drawing Sheets

THIRD PARTY ACCOUNT LINKING FOR VOICE USER INTERFACE

BACKGROUND

Electronic devices, such as voice activated electronic devices, are capable of performing various functionalities. Some functionalities associated with applications require a user to log into their account with the application to fully harness those functionalities.

DETAILED DESCRIPTION

Figure 1A:
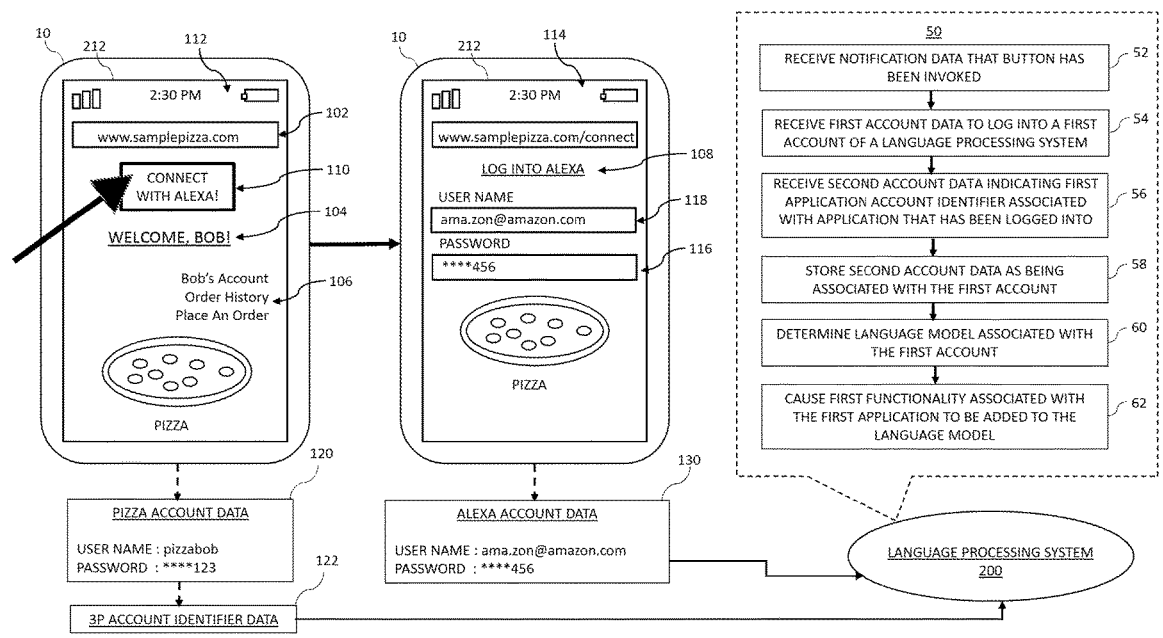
FIG. 1A is an illustrative diagram of an exemplary system for linking a first account associated with a first application to a second account associated with a language processing system such that a language model associated with the second account is updated to include a first functionality associated with the first application, in accordance with various embodiments.

The present disclosure, as set forth below, is generally directed to various embodiments of methods and systems for adding a first functionality to a language model associated with a first account of a language processing system. In particular, the first functionality may be associated with a first application, where an individual may have a second account with the first application. In some embodiments, a button, such as one included within a webpage corresponding to the first application, may cause allow an individual's account with the first application to be linked to the individual's account with the language processing system. The language processing system may then be capable of updating a language model associated with the first account to include first functionality associated with the first application, thereby allowing the individual interact with the first application using one or more devices associated with the language processing system.

In a non-limiting embodiment, an individual may log into a first account associated with a language processing system using a first electronic device. For example, the individual may provide first account data representing first account credentials (e.g., username, email address, telephone number, password, etc.) to authenticate the first electronic device as being associated with that individual's account with the language processing system. The first account data may be sent to the language processing system, which may determine whether the first account credentials are correct. If so, the language processing system may provide notification data to the first electronic device indicate that the first electronic device is authorized as being associated with the first account. If not, the individual may be prompted to re-enter their account credentials, create an account, and/or enter additional account credentials/verification information. In some embodiments, the first electronic device may already be "logged-in" to the first account of the language processing system, and therefore the individual may not be required to input account credentials.

In some embodiments, an individual may access a first webpage (e.g., a website or a web view of the website) associated with a first application using the first electronic device. For example, an individual may access a pizza delivery service's mobile application using the individual's mobile device (e.g., smart phone, tablet, laptop, etc.). A uniform resource locator ("URL") associated with the pizza delivery service may be input into a web browser functionality of the first electronic device. Upon rendering the first webpage using the mobile device, the individual may be prompted to input second account credentials for logging into a second account associated with the first application. For example, the individual may have a registered account on the pizza delivery service's system that may include payment information to be used for placing orders with the pizza delivery service, contact information associated with the individual, order history information, and the like.

In some embodiments, the first webpage may include a button and/or button functionality that is capable of causing the first account with the language processing system and the second account with the first application's system to be associated with one another. In response to the button being invoked, a first identifier associated with the second account may be sent to the language processing system to be stored as being associated with the first account. Additionally, the language processing system may store a first application identifier indicating which application that the language processing system is capable of interacting with, as being associated with the first account. In some embodiments, the first identifier may be a token generated by the first webpage running on the mobile device. For example, in response to the button being invoked, the first webpage may generate an identifier, and may store that identifier within the application's database as being associated with the particular account that is currently logged into the application's system. After the identifier is generated and the language processing system account has been logged into, the identifier may be sent to the language processing system to be stored as being associated with the language processing system account.

In some embodiments, pressing the button may further cause the first functionality associated with the first application to be enabled for the first account. For instance, a language model associated with the first account may be updated to include invocation phrase data, sample utterance template data, sample response template data, slot data, and values capable of being filled in for the slot data that are associated with the first functionality. At this point, an individual may use any of their devices rendering a voice user interface that interacts with the language processing system to interact with the first application using, primarily, voice. For example, the individual may speak an utterance, "Alexa, order me a pizza using 'Pizza Application'," to a second electronic device, which may be a voice activated electronic device. In response to detecting a wakeword (e.g., "Alexa"), the second electronic may send audio data representing the utterance to the language processing system. The language processing system may then be configured to generate text data representing the audio data, and may determine an intent of the utterance. Using the text data, the language processing system may determine that the utterance substantially matches sample utterance text data associated with the first functionality, indicating that an intent of the utterance is associated with an action to be performed by the first application (e.g., ordering a pizza using the pizza delivery service's system). In response to determining the intent, the language processing system may receive second account data representing the account identifier for the account with the first application from the first account, and may send the second account data, along with the first intent and the text data, to the first application. Additionally, the language processing system may send first account data representing another account identifier associated with the first account of the language processing system. For example, the language processing system may send text data including resolved entities to the pizza delivery service's system, along with account data representing the pizza account identifier (e.g., pizzabob, pizza_token, etc.) and account data representing the language processing system identifier (e.g., ama.zon@amazon.com, XXX123, etc.).

Upon receipt, the application's system (e.g., the pizza application's system) may determine that the second account data represents the account identifier is associated with a particular account of the application. For example, the pizza delivery service's system may receive the data and may determine the particular pizza account associated with that identifier. The application system may then store the language processing account identifier, represented by the first account data, as being associated with the second account. Therefore, the application's system may now have stored a mapping indicating that any subsequent requests received from an account with the language processing system that is associated with the language processing account identifier is to be associated with the account of the application's system that is associated with the application account identifier. For example, if the language processing account corresponds to account 1, and has an identifier LP_1, and the pizza delivery service account corresponds to account 2, and has an identifier PDS_1, then any time a request is received from the language processing system where the request is associated with the identifier LP_1, the pizza delivery service system may identify that request as being associated with account 2, corresponding to identifier PD_1.

The button, in one embodiment, may be a selectable input displayed within a portion of the first webpage. For example, display data representing the first webpage may include a portion that represents the button. If an individual touches a display screen, or clicks on a portion of the webpage where the button is being rendered, the electronic device may receive this selection as an actionable input causing the account data to be sent to the language processing system.

In some embodiments, third account data representing the first account data may be generated, where the third account data masks and/or obfuscate the first account data such that the first application is does not receive any specific account information associated with the first account. Instead, an identifier, such as a web security token, or one time generated token, that indicates the first account data may be generated by the language processing system and stored as being associated with the second account data, the application identifier, and the first account. Similarly, the first application may also generate a masked and/or obfuscated version of the account data associated with the first application account such that the first application system does not provide the language processing system with the first application account data. When a request is sent to the application's system, the third account data may be sent to the first application. For example, a token representative of the language processing system account may be sent to the first application system. The first application may store the token as being associated with the second account. In this way, when the request is received by the first application, the first application is capable of identifying the account that the request is received from without receiving the language processing system's account credentials. While linking accounts using the account data associated with the first application and the language processing system is possible, for privacy and security, tokens or identifiers associated with each account may instead be used.

In some embodiments, an electronic device, such as those described previously, may be a sound controlled electronic device. A sound controlled electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device is one type of sound controlled electronic device. In response to determining that a wakeword has been uttered, the voice activated electronic device may, in some embodiments, send the audio data representing a spoken utterance subsequently following the wakeword to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or may cause one or more additional electronic devices to output content and/or perform a particular action (e.g., turn on a light, preheat an oven, etc.). Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music," or "Alexa—Buy that." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the electronic device may additionally, or alternatively, correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1A is an illustrative diagram of an exemplary system for linking a first account associated with a first application to a second account associated with a language processing system such that a language model associated with the second account is updated to include a first functionality associated with the first application, in accordance with various embodiments. In the non-limiting embodiment, a first electronic device 10 may display a first webpage 112 on a display screen 212. First webpage 112 may, for instance, be a website rendered using a web browser, or may be a web view of a website. For example, first webpage 112 may correspond to an application running on electronic device 10, where the application includes instructions (e.g., HTML, Javascript) that allows electronic device 10 to render a web view version of first webpage 112.

In some embodiments, an individual may log into an account associated with a first application's system that facilitates first webpage 112. For example, first webpage 112 may correspond to a pizza delivery service's webpage. An individual may access first webpage 112 using electronic device 10 by entering in a URL within a web address bar 102 (e.g., www.samplepizza.com). Upon accessing first webpage 112, an individual may enter account credentials associated with their account with the first application's backend system. For example, an individual may have an account with a pizza delivery service, and may enter in their account data 120 to "log-in" to their account with the pizza delivery service. After successfully "logging-in," the individual may interact with the pizza delivery service's backend system, and the pizza delivery service's backend system may recognize electronic device 10 as corresponding to the individual's account. In some embodiments, account data 120 may include a user name and password, however account data 120 may correspond to any suitable identification information. For example, account data 120 may include account identifiers, email addresses, security tokens, and the like. In some embodiments, certain account data may be stored within memory of electronic device 10, and when prompted, an individual may provide access to the stored account data. For example, electronic device 10 may include fingerprint scanning functionality, facial detection functionality, and/or speaker identification functionality, which may be used to protect certain data unless a certain input (e.g., a fingerprint scan, facial scan, and/or acoustic vector) is determined to match a stored value, at which point the data may be accessible to one or more systems in communication with electronic device 10.

Upon successfully entering account data 120 for the pizza delivery service, display data representing first webpage 112 may be sent to electronic device 10 from the pizza delivery service's system. First webpage 112 may include, in one embodiment, a welcome message 104 (e.g., "Welcome, Bob!") to signify a name of the individual whose account was logged into. First webpage 112 may also include menu bar 106, which may include selectable options for the user such as, but not limited to, account information, order history information, and an option to place an order with the pizza delivery service. As an illustrative example, an individual may select the "Place An Order" option within menu bar 106 to place an order for a pizza to be delivered. In this particular scenario, because the individual has logged into the pizza delivery service's system with their account credentials (e.g., pizza account data 120), the pizza delivery service's system may be aware of payment information and a delivery address information associated with the individual's account such that if/when the individual places an order, the individual may not need to input that information again.

In some embodiments, first webpage 112 may include a button 110. Button 110 may, for example, correspond to a physical button or a button displayed on a display screen.

For instance, button 110 may be selected by an individual touching a portion of display screen 212 associated with a location where button 110 is being displayed. In response to determining that button 110 has been selected (e.g., detecting a capacitive change about display screen 212 where button 110 is located), electronic device 10 may be configured to perform one or more tasks. In some embodiments, however, button 110 may alternatively correspond to a switch, knob, or any other suitable input mechanism to facilitate a specified action. In still yet additional embodiments, various other touch inputs (e.g., swipes, drags, long presses, etc.), and/or voice inputs (e.g., utterances, non-speech sounds, etc.) may be used as inputs instead of, or in addition to, button 110.

In some embodiments, selection of button 110 may cause the application's system to generate third party ("3P") account identifier data 122 representing account data 120. 3P account identifier data 122 may, in one example embodiment, correspond to a unique identifier that represents account data 120, but may not include the user name and/or password, associated with an individual's account with the application's system. For instance, account identifier data 122 may include just the user name so as to not provide language processing system 200 with all of the secure account data associated with the application's account. In some embodiments, account identifier data 122 may correspond to a security token generated by the corresponding application's system to represent the account with the application's system. For instance, a SOAP token, or any other web security token (e.g., a one-time generated access token) may be generated. As an illustrative example, an obfuscated account identifier, such as an obfuscated user name, may be generated in response to button 110 being pressed. The application's system (e.g., the pizza delivery service's backend system) may then store account identifier data 122 as being associated with the account with the application's system that was logged.

In some embodiments, selection of button 110 may cause the application's system to provide electronic device 10 additional display data representing second webpage 114. Second webpage 114 may allow an individual to log into an account that he/she may have with a language processing system 200. For instance, upon selecting button 110, a new URL may be accessed that is associated with securely logging-in to language processing system 200. Second webpage 114 may include, amongst other features, a welcome bar 108 indicating to the individual that he/she is now capable of entering in account credentials associated with his/her account with language processing system 200. Additionally, second webpage 114 may include a user name input portion 118 and a password input portion 116 that allow an individual to input a user name and password, respectively, for logging into the individual's account with language processing system 200. As an illustrative example, the individual may input account data 130 (e.g., user name, password, email address, account identifier, security token, etc.) associated with an account of the individual on language processing system 200. In some embodiments, selection of button 110 may, alternatively, cause electronic device 10 to access language processing system 200 such that second webpage 114 is provided to electronic device 10 from language processing system 200. In this way, button 110 may serve to direct the web browser rendering first webpage 112, hosted by an application's website, to second webpage 114, hosted by language processing system 200.

Language processing system 200 may, in one non-limiting embodiment, be configured to perform exemplary process 50. Process 50 may begin at step 52. At step 52, notification data may be received by language processing system 200 that indicates that button 110 has been invoked (e.g., pressed, tapped). For example, the notification data may indicate that an option has been selected for connecting an account associated with the pizza delivery service to an account associated with language processing system 200. In some embodiments, the notification data may be received by language processing system 200 from a first application's backend system. For instance, the pizza delivery service's backend system may host first webpage 112. In response to button 110 being pressed, the pizza delivery service's system may re-direct electronic device 10 to second webpage 114, which may be hosted by language processing system 200. Upon being directed to second webpage 114, the first application system may generate and send the notification data to language processing system 200.

At step 54, first account data for logging into a first account of a language processing system may be received. For example, account data 130, associated with a first account of language processing system 200, may be received by language processing system 200. In some embodiments, account data 130 may include a username and password for gaining access to the first account. Upon receipt, language processing system 200 may be configured to determine whether or not account data representing account credentials for an account of language processing system 200 is correct. If so, electronic device 10 may be identified as being operated by an individual associated with a particular account of language processing system 200 such that electronic device 10 may interact with language processing system 200 using the preferences and features associated with that account. However, in other embodiments, an account identifier associated with the first account and stored by electronic device 10 may be received. For example, electronic device 10 may store an account identifier associated with a language processing system account and upon accessing, or attempting to access, language processing system 200, the account identifier may be provided to authorize electronic device 10.

At step 56, second account data indicating a first application account identifier associated with an application that has been logged into may be received by language processing system 200. For example, language processing system 200 may receive account identifier data 122. Account identifier data 122 may represent account data 120, which may be associated with a first applications, such as a pizza delivery service's system. Account identifier data 122 may be an identifier that will allow language processing system 200 to complete an account linking process between an account of language processing system 200 and an account of an application's system. In some embodiments, account identifier data 122 may include a user name associated with the application's account, a token generated in response to button 110 being pressed to uniquely identify the application's account, and/or an obfuscated version of some or all of account data 120. Generally speaking, account identifier data 122 may correspond to any suitable account identifier that may allow the application's system to identify a particular account within their system without including all of the account credentials (e.g., username and password) associated with that account.

At step 58, the second account data may be stored by language processing system 200 as being associated with the first account. For instance, account identifier data 122 may be stored by language processing system 200 as being associated with the first account of language processing system 200. In some embodiments, an application identifier associated with the first application (e.g., the pizza delivery service's application) may also be sent to language processing system 200 to identify the particular application that account data 120 is associated with. The application identifier may also be stored with the second account data (e.g., account data 120) as being associated with the first account of language processing system 200. The application identifier may indicate a particular skill or other type of feature such that language processing system 200 is capable of identifying the application (e.g., pizza delivery service) that account identifier data 122 is associated with.

At step 60, a language model associated with the first account may be determined. The language model may indicate one or more rules, preferences, grammar models, and/or lexical data associated with the first account's particular configuration. Each account associated with language processing system 200 may be configured differently. That is, each account may include a slightly different language model that is specific to that account's preferences. In some embodiments, functionalities may be added to a language model associated with a particular account such that individual's operating devices associated with those accounts may be capable of harnessing those functionalities. As an illustrative example, a light switch functionality added to a particular account's language model may allow an individual to control a light switch using language processing system 200. For instance, when an individual speaks an utterance (e.g., "Alexa, turn my living room light on") to a voice activated electronic device, audio data representing the utterance may be sent to language processing system 200, which may generate text data representing the audio data and additionally may provide the text data to natural language understanding processing to determine an intent of the utterance. In this particular scenario, the individual's account with language processing system 200 may have its language model configured to include functionality associated with controlling a light switch. Therefore, the natural language understanding processing may be able to determine that the text data is associated with a particular utterance corresponding to an action to be performed by an application (e.g., to control a light switch). In response, language processing system 200 may cause the action to be performed (e.g., sending an instruction to turn a light on in a living room associated with that account).

At step 62, a first functionality associated with the first application may be added to the language model associated with the first account. For example, the pizza delivery service's functionality may be added to the first account with language processing system 200 such that an individual may use their device to order pizzas, or perform other tasks associated with the pizza delivery service, using one or more devices that are capable of interacting with language processing system. For instance, an individual may use a voice activated electronic device to order a pizza from the pizza delivery service without needing to input account credentials or opening their pizza delivery service application with electronic device 10. In order to add a particular functionality to a language model, invocation phrases, sample utterance templates, sample responses, slot data, and values may be added to the language model associated with the first account. In this way, when text data is received, natural language understanding processing associated with language processing system 200 may be capable of determining whether the text data is associated with a sample utterance associated with the first functionality. For example, text data representing the phrase, "Order a pizza," may be understandable by language processing system 200 as being associated with the pizza delivery service functionality.

Figure 1B:
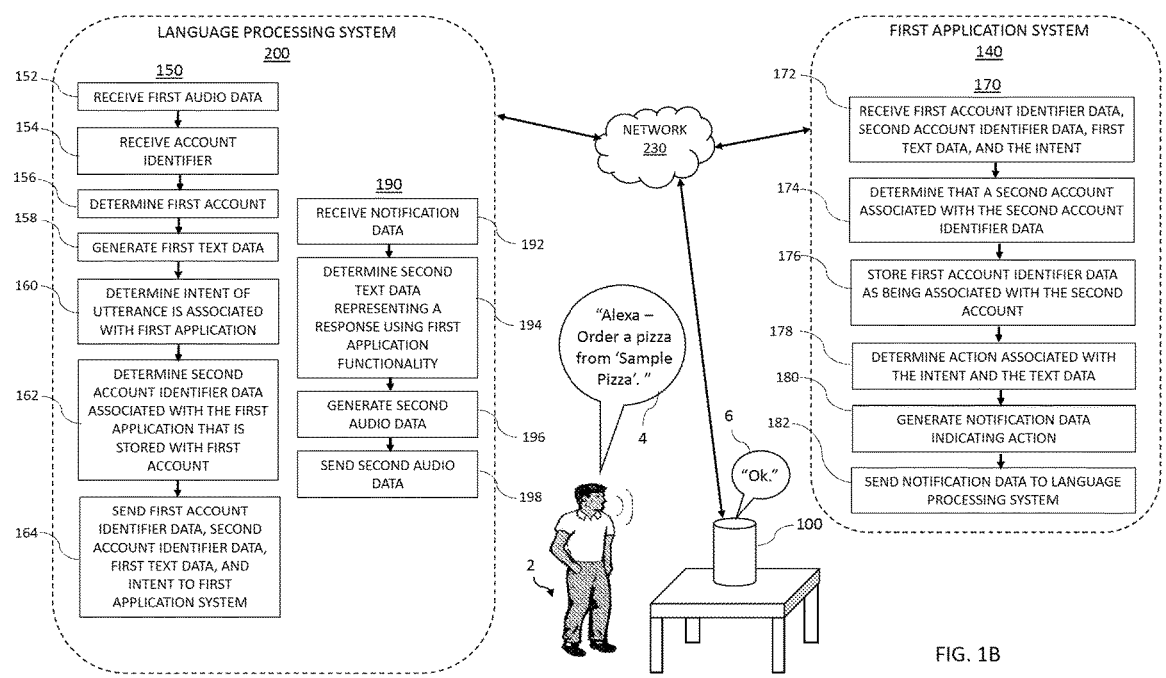
FIG. 1B is an illustrative diagram of an exemplary system for interacting with the first application of FIG. 1A to perform a first action using the first functionality, in accordance with various embodiments.

FIG. 1B is an illustrative diagram of an exemplary system for interacting with the first application of FIG. 1A to perform a first action using the first functionality, in accordance with various embodiments. In the non-limiting embodiment, an individual 2 may speak utterance 4 to voice activated electronic device 100. For instance, individual 2 may say, "Alexa—Order a pizza from 'Pizza Application'." In response to detecting a wakeword (e.g., "Alexa") for voice activated electronic device 100, voice activated electronic device 100 may package and send audio data representing utterance 4 to language processing system 200 via network 230. Language processing system 200 may then be configured to perform exemplary process 150, which may begin at step 152.

At step 152, first audio data representing utterance 4 may be received. However, in some embodiments, instead of receiving audio data, text data may be received by language processing system 200. For example, an individual may type in a command/request into electronic device 100, which may then be sent to natural language processing system 200. The aforementioned is merely exemplary. At step 154, an account identifier associated with electronic device 100 may be received. In some embodiments, the account identifier may be sent as metadata appended to the first audio data, however this is merely illustrative. The account identifier may indicate a particular account on language processing system 200 that electronic device 100 is associated with. In some embodiments, electronic device 100 may send a device identifier (e.g., a MAC address, a serial number, IP address, etc.) to language processing system 200, which in turn may be used to identify an account identifier.

At step 156, a first account on language processing system 200 may be determined based on the account identifier associated with voice activated electronic device 100. For instance, electronic device 100 may be associated with a first account of language processing system 200. The first account may include a first language model specific to the first account that may be customized to understand words and phrases spoken by individuals. The first account may also indicate other devices/systems that individual 2 may interact with/control using electronic device 100 and language processing system 200.

At step 158, first text data representing the first audio data may be generated. Upon receipt, the first audio data may be provided to an automatic speech recognition ("ASR") system capable of performing automatic speech recognition processing. The ASR system, as described in greater detail below with reference to FIG. 2A, may perform speech-to-text processing to the first audio data to generate first text data representing the first audio data. At step 160, an intent of the utterance may be determined to be associated with a first application. After the first text data is generated, the text data may be provided to a natural language understanding ("NLU") system to perform NLU processing to the text data. The NLU processing may use the language model(s) associated with the first user account in an attempt to determine an intent of utterance 4. For example, the NLU system may parse the text data into grammatical objects to determine the portions of the utterance associated with nouns, verbs, prepositions, etc. After this occurs, the grammatical objects may be used to generate a ranked list of intent hypothesis that the utterance may correspond to. The NLU system may determine one or more domains, which may also be referred to as categories that may be capable of handling the intent of the utterance. For example, utterance 4, "Order a pizza from 'Pizza Application'," may be identified by a Food domain as possibly being able to handle the corresponding request. For instance, the NLU system may identify that the word "order" may be a recognized intent as being an invocation word associated with the food domain, and may use various sample utterances and invocation phrases associated with the food domain to determine an intent of the utterance. In some embodiments, the NLU system may determine that the intent of utterance 4 is for placing an order with an application (e.g., {Intent}: "Order Item"), where the item to be ordered is a pizza (e.g., {Item To Be Ordered}: "Pizza"), and that a particular application to be used to order that item (e.g., {Skill/Application}: "Pizza Application").

At step 162, language processing system 200 may determine second account identifier data associated with the first application that is stored as being associated with the first account. For instance, account identifier data 122 may be stored as being associated with a first account of language processing system 200. After determining that the most likely intent associated with the utterance, language processing system 200 may determine the domain and/or application associated with carrying out an action associated with the intent. For example, in response to determining that an intent of utterance 4 corresponds to a request to order a pizza, language processing system 200 may determine that a pizza delivery service application is capable of facilitate the intent. In some embodiments, language processing system 200 may determine an application identifier associated with the application capable of servicing the intent. For instance, natural language processing may determine the intent of the utterance, and may identify a domain associated with that intent. The domain may then be used to determine the particular application, and thus the application identifier, that may be capable of facilitating an action associated with the intent. Language processing system 200 may also determine that, for intents related to the particular functionality associated with the pizza delivery service application, the first account include second account identifier data capable of being used to identify an account with the pizza delivery service's system that is to be associated with the first account of language processing system 200.

At step 164, first account identifier data, the second account identifier data, the first text data, and the intent associated with the first utterance may be sent to a first application system associated with the first application. For instance, after determining that the first application is capable of facilitating the action associated with the first intent, language processing system 200 may determine that the first account includes the second account identifier data associated with a second account of the first application, which may be sent to the first application for facilitating the action. In some embodiments, the first account identifier data may be generated in response to the intent being determined, if the first account identifier data has not yet been generated. For example, the first time that an intent associated with the first application is identified, the first account identifier data may be generated by language processing system 200 and stored as being associated with the first account, as well as being associated with the second account identifier data and the application identifier associated with the first application (e.g., the pizza delivery service). In some embodiments, the first account identifier may correspond to an obfuscated version of the first account data is sent to the first application instead of the first account data. For example, the first account identifier may correspond to a token generated by language processing system 200 to represent the first account with language processing system 200. In this way, the first application's system may remain unaware as to the account credentials associated with the first account while still being able to associate the incoming request with the second account. Furthermore, in some embodiments, an application identifier associated with the first application may also be identified with the first intent and may be sent to the first application with the first account data (or masked data representing the first account data), the second account data, the first text data, and the intent.

In the illustrative non-limiting embodiment, language processing system 200, in response to identifying the intent of utterance 4 is associated with a first application (e.g., a pizza delivery service application) may be in communication with a first application system 140 associated with the first application. For example, first application system 140 may correspond to a pizza delivery service's backend system. First application system 140 may be configured to perform exemplary process 170. Process 170, for instance, may begin at step 172. At step 172, the first account identifier data, the second account identifier data, the first text data, and the intent associated with utterance 4 may be received by first application system 140.

At step 174, first application system 140 may determine that the second account identifier data is associated with a second account of first application system 140. For example, the second account identifier data may an account identifier associated with a particular account's credentials (e.g., username, email, telephone number, password, etc.) associated with a particular account. First application system 140 may be able to use the second account identifier data to determine the second account by checking an accounts database to determine whether or not there is an account associated with the second account identifier data, and whether the account identifier data allows access to that particular account. For example, account identifier data 122 may be stored as being associated with an account of the pizza delivery service's system. If account identifier data 122 is received with the intent and the first text data from language processing system 200, then first application system 140 may determine that a request is being received from an individual associated with the account of the pizza delivery service's system. As another example, if the account identifier corresponds to a user name associated with the first application, first application system 140 may check to see if a username included within the second account data matches a username associated with an account of first application system 140.

At step 176, the first account identifier data may be stored by the first application's backend system as being associated with the second account. For instance, the account identifier associated with the first account of language processing system 200 may be stored within memory by the first application's system to create a mapping linking the first account and the second account together. In this way, any subsequent requests received from language processing system 200 that are identified as originating from an account associated with the first account identifier may be recognized by first application system 140 as being associated with the second account.

At step 178, an action associated with the intent and the text data may be determined. For instance, the intent may be an "Order Pizza" intent. Using the text data and the intent, first application system may generate a request to order a pizza to be delivered. In this embodiment, because the second account data is provided, and therefore the second account is able to be accessed, first application system 140 may be able to obtain information capable of being used to facilitate the request. For example, the second account may include payment information such that the request to order the pizza may be paid for using stored credit card information associated with the second account. Furthermore, the second account may include delivery address information indicating an address that the order is to be sent to.

At step 180, notification data indicating the action has been/is going to be completed by first application system 140 may be generated. For instance, the notification data may indicate to language processing system 200 that a request associated with the intent is being processed. Therefore, language processing system 200 may be able to inform a requesting device (e.g., voice activated electronic device 100), that the action is being carried out. At step 182, the notification data may be sent to language processing system 200 using network 230. First application system 140 may identify the recipient of the notification data using the first account identifier data received at step 172.

Language processing system 200, in one embodiment, may further be configured to perform exemplary process 190, which may begin at step 192. At step 192, the notification data may be received. For instance, the notification data generated and sent by first application system 140 may be received by language processing system 200. In response to receiving the notification data, the functionality associated with the first application may determine an action to be performed by language processing system 200. At step 194, second text data representing a response using the first application's functionality may be determined. For example, the first functionality may have caused sample responses to be added to the language model associated with the first account. In response to receiving the notification data, language processing system 200 may determine text data representing a sample response to use to indicate that first application system 140 is carrying out the action requested by the intent of utterance 4.

At step 196, second audio data may be generated. Language processing system 200 may, for instance, include a text-to-speech ("TTS") system. Upon the second text data being determined, the TTS system may be provided with the second text data, and may perform text-to-speech processing to the second text data to generate second audio data representing the second text data. At step 198, the second audio data may be sent to the requesting device. For example, the second audio data may be sent to voice activated electronic device 100, which in turn may output response 6—"Ok"—to indicate to individual 2 that utterance 4 has been processed, and that an action associated with the utterance is occurring. By providing the second account data with the intent to the first application system, the action associated with the utterance may be performed without individual 2 being required to separately log into their account with first application system 140.

Figure 2A:
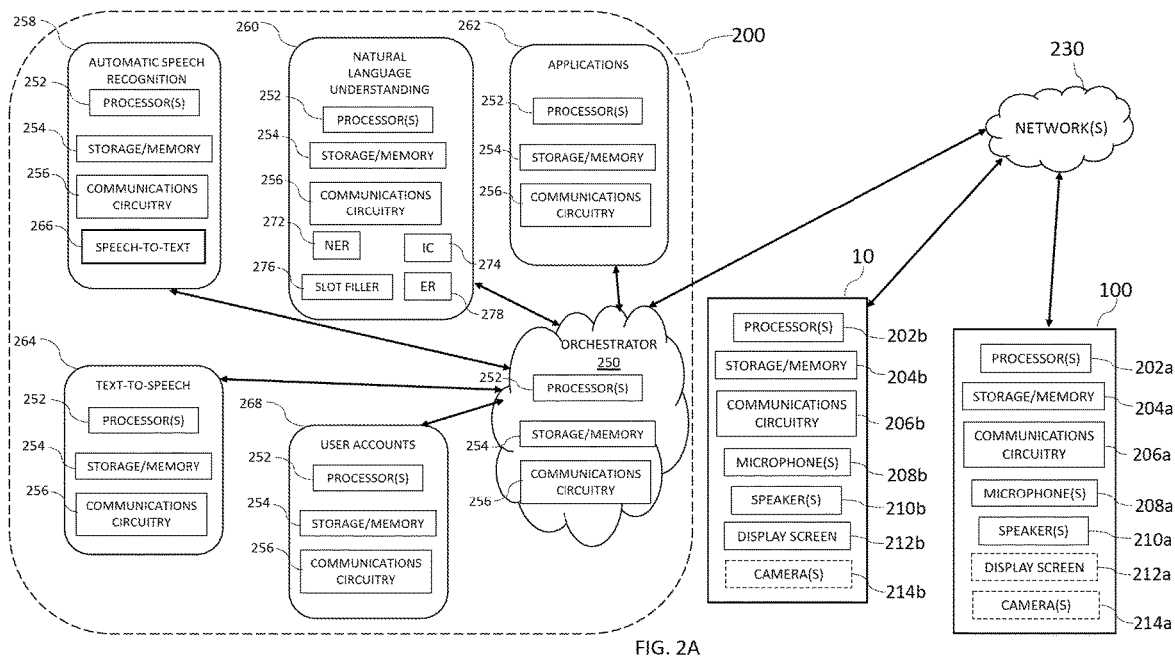
FIG. 2A is an illustrative diagram of the system architecture of FIGS. 1A and 1B, in accordance with various embodiments.

FIG. 2A is an illustrative diagram of the system architecture of FIGS. 1A and 1B, in accordance with various embodiments. In particular, FIG. 2A may include electronic device 10, as described in FIG. 1A, and electronic device 100, as described in FIG. 1B, which may both be capable of communicating with language processing system 200 using network(s) 230. In some embodiments, electronic devices 10 and 100 may be substantially similar to one another, however this is merely exemplary.

Electronic device 100 may, in some embodiments, include sound controlled functionality, such as one or more voice and/or sound activated components. In some embodiments, electronic device 100 may be configured to communicate with language processing system 200 in response to detecting an utterance including a wakeword, which may subsequently be followed by a request/question/statement. Similarly, electronic device 100 may alternatively or additionally include one or more manually activated components for manually activating electronic device 100. In this particular scenario, electronic device 100 may also be configured, in one embodiment, to communicate with language processing system 200 in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with language processing system 200, send audio data to language processing system 200, and await/receive a response from language processing system 200. In some embodiments, however, non-voice/sound activated devices may also communicate with language processing system 200. For example, in response to a button or touch screen being pressed, or a button or touch screen being pressed and held, a microphone associated with electronic device 100 may begin recording local audio, establish a connection with language processing system 200, send audio data representing the captured audio to language processing system 200, and await/receive a response, and/or action to be occur, from language processing system 200.

Language processing system 200 may be located within a dedicated computing device or computing system, which may or may not be in communication with one or more additional devices. For instance, language processing system 200 may be located on a remote computing system with which an individual subscribes to a service on. However, language processing system 200 may also be included within a computing system locally stored or owned by an individual.

Electronic device 100 may include one or more processors 202a, storage/memory 204a, communications circuitry 206a, one or more microphones 208a or other audio input devices (e.g., transducers), one or more speakers 210a or other audio output devices, a display screen 212a, and one or more cameras 214a or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202a, storage/memory 204a, communications circuitry 206a, microphone(s) 208a, speaker(s) 210a, display screen 212a, and/or camera(s) 214a. For example, a centralized control device of electronic device 100 may include one or more microphone(s) 208a. These microphone(s) 208a may receive audio input signals, and electronic device may determine whether or not the audio input signals indicate that a wakeword was uttered. If so, then electronic device may cause audio data representing an utterance including the wakeword, or spoken after the wakeword. To be sent to language processing system 200.

Electronic device 10, in the illustrative embodiment, may be substantially similar to electronic device 100. Electronic device 10, for instance, may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 10 may be relatively simple or basic in structure such that no, or a minimal number of, mechanical input option(s) (e.g., keyboard, mouse, track pad) or touch input(s) (e.g., touch screen, buttons) are included. For example, electronic device 10 may be able to receive and output audio, and may include power, processing capabilities, storage/memory capabilities, and communication capabilities. However, in other embodiments, electronic device 10 may include one or more components for receiving mechanical inputs or touch inputs, such as a touch screen and/or one or more buttons. In one embodiment, electronic device 10 may correspond to a sound controlled electronic device (e.g., a voice activated electronic device) and electronic device 10 may correspond to a non-sound controlled electronic device (e.g., a smartphone, tablet, laptop, etc.).

Electronic device 10 may further include one or more processors 202b, storage/memory 204b, communications circuitry 206b, one or more microphones 208b, speaker(s) 210b, a display screen 212b, and one or more cameras 214b. In some embodiments, electronic device 10 may include substantially similar capabilities as that of electronic device 100. However, in one embodiment, electronic device 10 may include display screen 212b as opposed to display screen 212a being optional, as is the case with electronic device 100. The aforementioned is merely exemplary.

Processor(s) 202a and 202b, which may be referred to herein collectively as processor(s) 202, may include any suitable processing circuitry capable of controlling operations and functionality of electronic device(s) 10 and/or 100, as well as facilitating communications between various components within electronic device(s) 10 and/or 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device(s) 10 and/or 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device(s) 10 and/or 100.

Storage/memory 204a and 204b, which may be referred to herein collectively as storage/memory 204, may include one or more types of storage mediums such as any volatile or non-volatile memory, or any removable or non-removable memory implemented in any suitable manner to store data for electronic device(s) 10 and/or 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic device(s) 10 and/or 100 and language processing system 200. For example, the media system may store one or more communications protocols that may be executed by processor(s) 202 for facilitating communications for electronic device(s) 10 and/or 100. In some embodiments, a sessions initiation protocol ("SIP") may be used to facilitate media transfer between electronic device(s) 10 and/or 100 and one or more of language processing system 200 and another instance of electronic device(s) 10 and/or 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device(s) 10 and/or 100. In some embodiments, a Web Real-Time Communications ("WebRTC") protocols may be employed by electronic device(s) 10 and/or 100. In a non-limiting embodiment, the media system may include instructions that indicate which communications protocols to employ for facilitating media transfer between devices based on a device type of electronic device(s) 10 and/or 100. For example, if electronic device(s) 10 and/or 100 does not include display 212 and/or camera 214, then the media system may indicate that PJSIP should be used, whereas if electronic device(s) 10 and/or 100 include(s) display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210, and/or a speech-to-text ("STT") component capable of converting received audio signals into text to be sent to speech-processing system for processing.

The wakeword database may be a database stored locally by storage/memory 204 of electronic device(s) 10 and/or 100, and may include a list of a current wakeword for electronic device(s) 10 and/or 100, as well as one or more previously used, or alternative, wakewords for electronic device(s) 10 and/or 100. In some embodiments, an individual may set or program a wakeword for their electronic device(s) 10 and/or 100. The wakeword may be programmed directly on electronic device(s) 10 and/or 100, or a wakeword or wakewords may be set by the individual via a local client application that is in communication with language processing system 200. For example, an individual may use their mobile device having the speech-processing system application running thereon to set the wakeword. The specific wakeword may then be communicated from the mobile device to language processing system 200, which in turn may send/notify electronic device(s) 10 and/or 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device(s) 10 and/or 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device(s) 10 and/or 100 may then begin transmitting the audio signal to language processing system 200 for detecting and responds to subsequent utterances made by an individual.

In some embodiments, storage/memory 204 may store voice biometric data associated with one or more individuals. For example, an individual that operates electronic device(s) 10 and/or 100 may have a registered user account on language processing system 200 (e.g., within accounts system 268). In some embodiments, electronic device(s) 10 and/or 100 may be associated with a group account, and various individuals may have user accounts that are operating under the rules and configurations of the group account. As an illustrative example, electronic device(s) 10 and/or 100 may be associated with a first group account on language processing system 200, the first group account being for a family that lives at a household where electronic device(s) 10 and/or 100 is located. Each family member may also have a user account that is linked to the first group account (e.g., a parent, a child, etc.), and therefore each user account may obtain some or all of the rights of the first group account. For example, electronic device(s) 10 and/or 100 may have a first group account on language processing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Communications circuitry 206a and 206b, which may be referred to herein collectively as communications circuitry 206, may include any circuitry allowing or enabling one or more components of electronic device(s) 10 and/or 100 to communicate with one another, and/or with one or more additional devices, servers, and/or systems. For example, communications circuitry 206 may facilitate communications between electronic device(s) 10 and/or 100 and language processing system 200. As an illustrative example, audio data representing an utterance (e.g., utterance 4 of FIG. 1B) may be transmitted over a network 230, such as the Internet, to language processing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device(s) 10 and/or 100 and language processing system 200. In some embodiments, electronic device(s) 10 and/or 100 and language processing system 200 may communicate with one another via a web browser using HTTP. Various additional communication protocols may be used to facilitate communications between electronic device(s) 10 and/or 100 and language processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, Bit-Torrent, FTP, RTP, RTSP, SSH, and/or VOIP.

Communications circuitry 206 may use any communications protocol, such as any of the previously mentioned exemplary communications protocols. In some embodiments, electronic device(s) 10 and/or 100 may include one or more antennas to facilitate wireless communications with a network using various wireless technologies (e.g., Wi-Fi, Bluetooth, radiofrequency, etc.). In yet another embodiment, electronic device(s) 10 and/or 100 may include one or more universal serial bus ("USB") ports, one or more Ethernet or broadband ports, and/or any other type of hardwire access port so that communications circuitry 206 allows electronic device(s) 10 and/or 100 to communicate with one or more communications networks.

Electronic device(s) 10 and/or 100 may also include one or more microphones 208a and/or 208b, which may be referred to herein collectively as microphone(s) 208, and/or transducers. Furthermore, one or more microphones located within a separate device may be in communication with electronic device(s) 10 and/or 100 to capture sounds for electronic device(s) 10 and/or 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device(s) 10 and/or 100 may include multiple microphones (e.g., four, seven, ten, etc.) placed at various positions about electronic device(s) 10 and/or 100 to monitor/capture any audio outputted in the environment where electronic device(s) 10 and/or 100 is located. The various microphones 208 may include some microphones optimized for distant sounds, while some microphones may be optimized for sounds occurring within a close range of electronic device(s) 10 and/or 100. In some embodiments, microphone(s) 208 may only begin to detect audio signals in response to a manual input to electronic device(s) 10 and/or 100. For example, a manually activated device may begin to capture audio data using microphone(s) 208 in response to a user input, such as pressing a button, tapping a touch screen, or providing any touch input gesture to a touch input component.

Electronic device(s) 10 and/or 100 may include one or more speakers 210a and/or 210b, which may be referred to herein collectively as speaker(s) 210. Furthermore, electronic device(s) 10 and/or 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device(s) 10 and/or 100 may be located. In some embodiments, speaker(s) 210 may include headphones or ear buds, which may be wirelessly wired, or hard-wired, to electronic device(s) 10 and/or 100, that may be capable of broadcasting audio directly to an individual.

In some embodiments, one or more microphones 208 may serve as input devices to receive audio inputs. Electronic device(s) 10 and/or 100, in the previously mentioned embodiment, may then also include one or more speakers 210 to output audible responses. In this manner, electronic device(s) 10 and/or 100 may function solely through speech or audio, without the use or need for any input mechanisms or displays, however this is merely exemplary.

Display screen(s) 212a and/or 212b, which may be referred to herein collectively as display screen(s) 212, may correspond to a display device and/or touch screen, which may be any size and/or shape and may be located at any portion of electronic device(s) 10 and/or 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device(s) 10 and/or 100. For instance, electronic device(s) 10 and/or 100 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any suitable number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device(s) 10 and/or 100 may be configured to determine which pixels are associated with a particular location point, and which item or items are also displayed at that pixel location. Furthermore, electronic device(s) 10 and/or 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, the aforementioned display ratios and pixel numbers are merely exemplary, and any suitable display resolution or pixel number may be employed for display screen 212, such as non-HD displays, 4K displays, and/or ultra displays.

In some embodiments, electronic device(s) 10 and/or 100 may include one or more cameras 214a and/or 214b, which may be referred to herein collectively as camera(s) 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device(s) 10 and/or 100 may include multiple cameras 214, such as one or more front-facing cameras and/or one or more rear facing cameras. Furthermore, camera(s) 214 may be configured to recognize far-field imagery (e.g., objects located at a large distance away from electronic device(s) 10 and/or 100) or near-filed imagery (e.g., objected located at a relatively small distance from electronic device(s) 10 and/or 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device(s) 10 and/or 100. For instance, camera(s) 214 may be external to, and in communication with, electronic device(s) 10 and/or 100. For example, an external camera may be capable of capturing images and/or video, which may then be provided to electronic device(s) 10 and/or 100 for viewing and/or processing.

In some embodiments, display screen 212*a* and/or camera(s) 214*a* may be optional for electronic device 100. For instance, electronic device 100 may function using audio inputs, and outputting audio in response or causing one or more actions to occur in response, and therefore display screen 212*b* and/or camera(s) 214*b* may not be included. Furthermore, in some embodiments, electronic device 100 may not include display screen 212*b* and/or camera(s) 214*b*, but instead may be in communication with display screen 212*b* and/or camera(s) 214*b*. For example, electronic device 100 may be connected to a display screen via a Wi-Fi (e.g., 802.11 protocol) connection such that visual content sent to electronic device 100 may be sent to the display screen, and output thereby. Similarly, camera(s) 214*b* may be optional for electronic device 10, and the previous description regarding camera(s) 214*a* may apply.

In one exemplary embodiment, electronic device(s) 10 and/or 100 may include an additional input/output ("I/O") interface. For example, electronic device(s) 10 and/or 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device(s) 10 and/or 100 may include one or more lights, light emitting diodes ("LEDs"), or other visual indicator(s). In some embodiments, one or more features of the output portion of the I/O interface may be included in a purely voice activated version of electronic device(s) 10 and/or 100. For example, one or more LED lights may be included on electronic device(s) 10 and/or 100 such that, when microphone(s) 208 receive audio, the one or more LED lights become illuminated signifying that audio has been received by electronic device(s) 10 and/or 100. In some embodiments, one or more vibrating mechanisms or other haptic features may be included with electronic device(s) 10 and/or 100 to provide a haptic response to an individual.

In some embodiments, electronic device(s) 10 and/or 100 may include radiofrequency identification ("RFID") functionality and/or near field communication ("NFC") functionality. Furthermore, in some embodiments, electronic device(s) 10 and/or 100 may include one or more infrared ("IR") sensors and one or more IR emitters. The IR sensors/emitters may be used to determine depth information. For example, in one embodiment, a distance of an individual from electronic device(s) 10 and/or 100 may be determined using the one or more IR sensors/emitters. Depth determination may be performed using any depth determination technique. In some embodiments, a distance between an individual and electronic device(s) 10 and/or 100 may be employed as a basis for presenting content with varying density using display screen 212. In some embodiments, electronic device(s) 10 and/or 100 may include beaconing functionality that allows electronic device(s) 10 and/or 100 to recognize when one or more devices are located nearby. For example, electronic device(s) 10 and/or 100 may include beaconing detection functionality that generates a beaconing signal, and attempts to determine whether any devices nearby are capable of detecting that signal. If so, then that may indicate that a particular device is proximate to electronic device(s) 10 and/or 100.

In some embodiments, contextual metadata may be obtained by computer vision analysis of an object detected by camera(s) 214. For example, in response to speaking the utterance, "Buy this," electronic device(s) 10 and/or 100 may cause camera(s) 214 to capture an image. That image may be analyzed to determine what the object is, and the contextual metadata associated with that objects identify may be determined. For instance, if an individual is holding up a bottle of ketchup, then the computer vision analysis may be able to determine a product name, bar code, and/or any other attribute about the bottle of ketchup from the captured image, and may populate a contextual metadata structure indicating the determined values (e.g., 'Item Name' slot: "Ketchup").

Language processing system 200 may include various components and modules including, but not limited to, automatic speech recognition ("ASR") system 258, natural language understanding ("NLU") system 260, applications/skills system 262, text-to-speech ("TTS") module 264, and user accounts system 268. In some embodiments, language processing system 200 may also include an orchestrator system 250 capable of orchestrating one or more processes to be performed by one or more of ASR system 258, NLU system 260, applications/skills system 262, TTS system 264, and/or user accounts system 268, as well as one or more additional components, devices, and/or systems associated therewith. Language processing system 200 may also include computer readable media, including, but not limited to, flash memory, random access memory ("RAM"), and/or read-only memory ("ROM"). Language processing system 200 may also include various modules that store software, hardware, logic, instructions, and/or commands for language processing system 200, such as a speaker identification ("ID") module, or any other module, or any combination thereof.

ASR system 258 may be configured to recognize human speech in detected audio, such as audio captured by electronic device 100, which may then be transmitted to language processing system 200. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR system 258 may include speech-to-text ("STT") system 266. STT system 266 may employ various speech-to-text techniques. Any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by language processing system 200, such as the expression detector mentioned above with regards to electronic device 100 (and/or electronic device 10). Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that a particular word or phrase (e.g., a wake-word), is represented within the audio signal. The expression detector may then compare that score to a threshold value to determine whether that word or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, language processing system 200, or by another device, such as a separate device or server capable of performing one or more additional functionalities thereon (e.g., a television capable of outputting video content).

NLU system 260 may be configured such that it determines an intent of an utterance based on the received audio data. NLU system 260 may determine one or more domains, which may also be referred to as categories that may be capable of handling the intent of the utterance. For example, the utterance, "Play this," may be identified by a Music domain, an E-Book domain, and a Video domain as possibly being able to handle the corresponding request. For instance, NLU system 260 may identify that the word "Play" may be a recognized intent of each of the aforementioned domains (as well, possibly, other domains). In some embodiments, to determining an utterance's intent, NLU system 260 may communicate with applications/skills system 262 to cause one or more specific functionalities to be accessible, perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 4) as well as the pertinent pieces of information in the text that allow an action to be completed. For example, if a spoken utterance is processed by ASR system 258 and outputs the text, "call mom," NLU system 260 may determine that an intent of the utterance is to activate a telephone, or telephone functionality, and to initiate a call with a contact matching the entity "mom". In some embodiments, NLU system 260 may process several textual inputs related to the same utterance. For example, if ASR system 258 outputs N text segments (as part of an N-best list), then NLU system 260 may process all N outputs.

As will be discussed further below, NLU system 260 may be configured to parse and tag annotated text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example using a knowledge base stored within storage/memory 254 of NLU system 260 and/or storage/memory of language processing system 200.

To correctly perform natural language understanding processing of speech input, NLU system 260 may be configured to determine a domain of an utterance. By determining the domain, NLU system 260 may narrow down which services and functionalities offered by an endpoint device (e.g., electronic device(s) 10 and/or 100, language processing system 200, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of language processing system 200. Words in a single text query may implicate more than one service, and some services may be functionally linked (e.g., both a telephone service and a calendar service may utilize data from the contact list).

NER system 272 may be configured to receive a query in the form of one or more results from ASR system 258. NER system 272, which is described in greater detail within FIG. 2B, may then attempt to identify relevant grammars and lexical information that may be used to construe meaning of the one or more results. To do so, NER system 272 may begin by identifying potential domains that may relate to the received query. NLU system 260, may include a databases of devices within storage/memory 254 of NLU system 260 that may be used to identify domains associated with specific devices. For example, NLU system 260 may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "enablement," "shopping," "music," and/or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular user account of user accounts system 268 and/or electronic device 100. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both communications and music, the query may, substantially in parallel, the natural language understanding processing may use the grammar models and lexical information for communications, and may also use the grammar models and lexical information for music. The responses based on the query produced by each set of models is scored, with the overall highest ranked result from all applied domains is ordinarily selected to be the correct result, which is described in greater detail below with reference to FIG. 2B.

An intent classification ("IC") system 274 may parse the query to determine an intent or intents for each identified domain, where the intent corresponds to the action to be performed that is responsive to the query. Each domain is associated with a database of words linked to intents. For example, a music intent database of a music domain may link words and phrases such as "play," to a play music intent, "stop," to a stop playing music intent, and "mute" to a mute volume intent. IC system 276 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "Play 'Song 1'" is an identified intent, a grammar framework may correspond to sentence structures such as "Play {Song 1}."

NER system 272 may parse the query to identify words as subject, object, verb, preposition, etc., based on grammar rules and/or models, prior to resolving named entities. The identified verb may be used by IC module 274 to identify intent, which is then used by NER system 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart'" might produce a result of: {Domain} Shopping, {Intent} "Add item to," {Anaphoric Term}: "this," and {List Type} "cart."

The output from NLU system 260 (which may include tagged text, commands, etc.) may then be sent to orchestrator 250 and/or a command processor, which may be located on, or may be in communication with, language processing system 200. The destination command processor may be determined based on the output of NLU system 260. For example, if NLU system 260 outputs include a command to play music, the destination command processor may be a music playing application, such as one located on electronic device(s) 10 and/or 100 or in a music playing application, configured to execute a music playing command to cause a particular audio file to output. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application.

In some embodiments, NLU system 260 may also include an entity resolution module 278, which allows NLU system 260 to query each domain of NLU system 260 to determine which domain or domains believe that they can handle a given request. Upon performing the query, each domain of domain system 272 may return a "score" indicating a likelihood that they can handle the application in question. For instance, various domains may return scores of LOW, MEDIUM, or HIGH, indicating the likelihood that they can handle the particular application. Entity recognition module 278 may return application names or titles for the request, which may be based on relevance scores that estimate a confidence that a particular application may be best used for the request. As an illustrative example, if the utterance is, "Play my music," NLU system 260 may determine, using entity resolution module 278, which domains, and thus applications, can likely handle this request, and may select the domain and/or application having the highest confidence score as being the domain and/or application able to handle the request. Furthermore, as described in greater detail below with reference to FIG. 2B, NLU system 260 may further include a slot filler module 276.

In some embodiments, NLU system 260 may include a contextual resolution system 270, which may be a system configured to identify entities for assisting natural language understanding processing using contextual metadata corresponding to content being displayed by display screen 212. Contextual resolution system 270 may receive contextual metadata from orchestrator 250 (e.g., that may be generated and sent from a particular domain of functionalities 262) and/or from electronic device(s) 10 and/or 100. The contextual metadata my include information associated with the particular content currently being rendered by a requesting device. In some embodiments, the contextual metadata may be obtained in response to receiving audio data. For example, in response to receiving audio data representing utterance 4, voice activated electronic device 100 may send a notification to language processing system 200 that indicates that content is currently being rendered by display screen 212a.

In one embodiment, orchestrator 250 may be configured to receive the audio data, and may determine that the notification has also been received. Orchestrator 250 may determine whether or not the notification indicates that there is (or was) content displayed by display screen 212 at the time that the utterance was spoken (e.g., when the wakeword was uttered). However, the determination of whether content is being displayed by display screen 212 may correspond to a time just prior to the wakeword being uttered, when the wakeword was uttered, after the wakeword was uttered, during the utterance being spoken, after the utterance was spoken, and/or after the audio data is sent to language processing system 200, and the aforementioned is merely exemplary. The notification may correspond to a flag, such as a logical 1/0, where if the flag has a value of 1, then this may indicate that content is being rendered by electronic device 100, whereas if the flag has a value of 0, then this may indicate that not content is being rendered by electronic device(s) 10 and/or 100.

Upon determining that electronic device(s) 10 and/or 100 is rendering content (e.g., receiving a notification indicating that content is being displayed by display screen 212), orchestrator 250 may generate and send a request to the various domains associated with applications/skills system 262 and NLU system 260. The request may inquire as to which domain, or domains, are currently providing electronic device(s) 10 and/or 100 with content, such as the content being rendered. Upon determining that domain, or domains, that are providing content, orchestrator 250 may request that the identified domain(s) generate and send contextual metadata representing text corresponding to the displayed content. After receiving the contextual metadata from the corresponding domain(s), orchestrator 250 may provide the contextual metadata to contextual resolution system 270, or otherwise cause the contextual metadata to be sent to NLU system 260.

In some embodiments, the various domains may include formatting logic (e.g., speechlets) that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being displayed by display screen 212 an utterance is spoken. For example, single item or detail web page of an item, such as a coffee maker, may include entity data organized into contextual slots such as {Item Name}, {List Position}, and {Item Identifier}. Values from the particular web page being displayed currently by display screen 212 may include: {Item Name}: "Coffee Maker," {List Position}: "1," and {Item Identifier}: "abcd1234." Different types of content may include different contextual slots. For example, lists may include {List Types}, {List Position}, {List Name}, etc.

In one non-limiting, illustrative embodiment, NLU system 260 may store prompts module including a listing of responses, arranged by a prompt identifier and its corresponding text data representation of a response. When a response is needed to be provided to a requesting device, such as electronic device(s) 10 and/or 100, NLU module 260 polls each domain to determine which domain should likely handle providing the response. Each domain may provide one or more prompt identifiers which correspond to a best response, and NLU module selects the prompt identifier having the highest ranking. For example, similarly to how NLU module 260 determined which domain can handle a particular application, NLU module 260 may also determine scores of LOW, MEDIUM, or HIGH, indicating the likelihood that a particular domain can handle the particular response. However, a particular prompt may be selected using any other suitable technique, and the aforementioned is merely exemplary.

Each prompt identifier may be associated with a particular response, and therefore the text data representing the particular response, such that when a prompt is selected to be used, NLU system 260 is capable of determining that the selected prompt corresponds to a particular response, and the text data representing that response may be provided to TTS system 264, which in turn may generate audio data representing that text data. That audio data, then, may be sent to the requesting device (e.g., electronic device(s) 10 and/or 100), such that an audio message of that response may be output by the requesting device. As an illustrative example, application enablement domain 222 may select a first prompt for use in responding to a first utterance. Thus, NLU system 260 may send text data corresponding to a prompt that is associated with a prompt identifier to TTS system 264. For example, text data representing the response, "Ok. {Application Name} is now {Enablement Status}," may be sent to TTS system 264. NLU system 260 may further send the slot results for slot data {Application Name} and slot data {Enablement Status} to TTS system 264, such that the framework of the selected response is formulated, and the text data representing the response may be used to generate audio data. For example, if {Application Name}: Skill 1, and {Enablement Status}: Enabled, then the response would be, "Ok. 'Skill 1' is enabled."

Various other prompts may be included. For example, NLU system 260 may include prompts 1, 2, 3, 4, 5, 6 . . . L, where L is any number greater than zero (e.g., L>0). Similarly, for however many prompts are included, there may be an associated response. For example, the responses with slots may respectively include, but are not limited to, "{Confirmation Status}. {Application Name} is now {Enablement Status}."; "Ok. {Application Name} is {Enablement Status}."; "Do you want to {Enablement Intent} {Application Name}?"; "I found {Number of Matches} application corresponding to {Object Identifier}. Which one did you mean?"; and "I'm sorry. I could not find any applications have the name {Object Identifier}."

In some embodiments, text data representing a response may be generated by language processing system 200. For instance, NLU system 260 and/or applications/skills system 262 may be employed to determine contextual features of a response to be generated, and may generate the corresponding text data representing that response. The text data may then be provided to TTS system 264, which may generate audio data representing the text data, which may then be sent to the requesting device.

When an application/skill of applications/skills system 262 is enabled for a particular account of language processing system 200, a language model associated with that account may be updated to include functionality associated with that application/skill. This may correspond to generating an updated language model for the user account. The updated language model may update a language model for the user account such that it now includes invocation phrase text data representing one or more invocation phrases that may be added to the individual's language model stored by their user account such that the one or more invocation phrases may be used for invoking the application. Furthermore, sample utterance text data representing one or more sample utterance templates, including slot data corresponding to one or more slots, fields, or placeholders may be added to the language model such the updated language module is capable of determining whether an additional utterance has a same format of one of the sample utterance templates for that application. Additionally, sample response text data representing one or more sample response templates, including response slot data representing one or more response slots, fields, or placeholders, may be added to the individual's language model such that the updated language model is capable of selecting one of the sample response templates to use for responding to a subsequent utterance associated with that application. Still further, the updated language model may include additional slot data representing one or more slot, field, or placeholder values for the application, to be used with one of the application response slots, fields, or placeholders.

Applications/skills system 262 may, for example, correspond to various action specific applications, which are capable of processing various task specific actions and/or performing various functionalities. Applications/skills system 262 may further correspond to first party applications and/or third party applications capable of performing various tasks or actions, or performing various functionalities. For example, based on the context of the audio received from electronic device(s) 10 and/or 100, language processing system 200 may use a certain application to generate a response, or to obtain response information, which in turn may be communicated back to electronic device(s) 10 and/or 100 and/or to another electronic device (e.g., a television). Applications/skills system 262 may also include processor(s) 252, storage/memory 254, and communications circuitry 256.

In some embodiments, an application of applications/skills system 262 may be written in various computer languages, such as JavaScript and Java. Various applications may include an intent schema file and a sample utterances file, such as, for example, IntentSchema.j son including the JSON defining the intents of a particular application, and a SampleUtterances.txt including plain text sample utterances for the particular application. Applications may also include application specific code, such as a JavaScript or Java file, common library code, and various other JavaScript or Java modules.

TTS system 264 may employ various text-to-speech techniques. In some embodiments any technique for transcribing speech may be suitable for computer implemented speech to text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

User accounts system 268 may store one or more user accounts or user profiles, corresponding to users having an account on language processing system 200. For example, a parent may have an account registered on language processing system 200, and each of the parent's children may have their own user profile registered under the parent's account. Information, settings, and/or preferences, for example, for each user profile may be stored by user accounts system 268. In some embodiments, user accounts system 268 may store a voice signal, such as voice biometric information, for a specific user profile. This may allow speaker identification techniques to be used to match a voice to voice biometric data associated with a specific user profile. In some embodiments, user accounts system 268 may store a telephone number assigned to a particular user profile. In some embodiments, user accounts system 268 may include a list of media items currently stored within an individual's registered account or user profile. For example, a list of music or videos purchased or obtained by an individual may be stored within the individual's user profile on user accounts system 268, which may be accessed by the individual when the individual seeks to hear a particular song or songs, or view a particular video or videos. User accounts system 268 may also include a listing of all applications currently enabled for each user profile. In some embodiments, NLU system 260 may receive indications of which applications are currently enabled for a particular user profile or account, such that NLU system 260 is aware of which rules and capabilities that language processing system 200 is able to perform for the particular user profile or account.

In some embodiments, an account stored by accounts system 268 may store account data associated with one or more applications. For example, an account associated with electronic device 100 may store account identifier data representing an account identifier associated with a separate application's system. This may allow requests that are being processed by language processing system 200 to include the account identifier request data (e.g., text data, intent data) sent to that application's system for completing an action associated with the request. For example, account identifier data representing a token indicating an account with a pizza delivery service may be included with data sent to the pizza delivery service's system to complete an order request received by electronic device 100. In some embodiments, accounts system 268 may further store account identifiers associated with an account of language processing system 200. For example, account data representing an obfuscated account identifier associated with an account of language processing system 200 may be stored by the account of language processing system 200, and may be used by language processing system 200 when communicating with additional devices, systems, and/or servers as to not provide those devices, systems, and/or servers with account data representing an individual's account credentials.

Orchestrator 250, in a non-limiting embodiment, may correspond to any suitable device, system, and/or logic capable of performing one or more processes. For example, orchestrator 250 may be configured to request contextual metadata from one or more domains/applications of applications/skills system 262 in response to receive a notification from electronic device 100 that content is currently being rendered thereby. In response to receiving the contextual metadata, orchestrator 250 may be configured to provide the contextual metadata to NLU system 260. In one embodiment, orchestrator 250 may include processor(s) 252, storage/memory 254, and communications circuitry 256.

Although each of ASR system 258, NLU system 260, applications/skills system 262, TTS system 264, user accounts system 268, and orchestrator 250 may each include instances of processor(s) 252, storage/memory 254, and communications circuitry 256, and those instances of processor(s) 252, storage/memory 254, and communications circuitry 256 within each of ASR system 258, NLU system 260, applications/skills system 262, TTS system 264, user accounts system 268, and orchestrator 250 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Figure 2B:
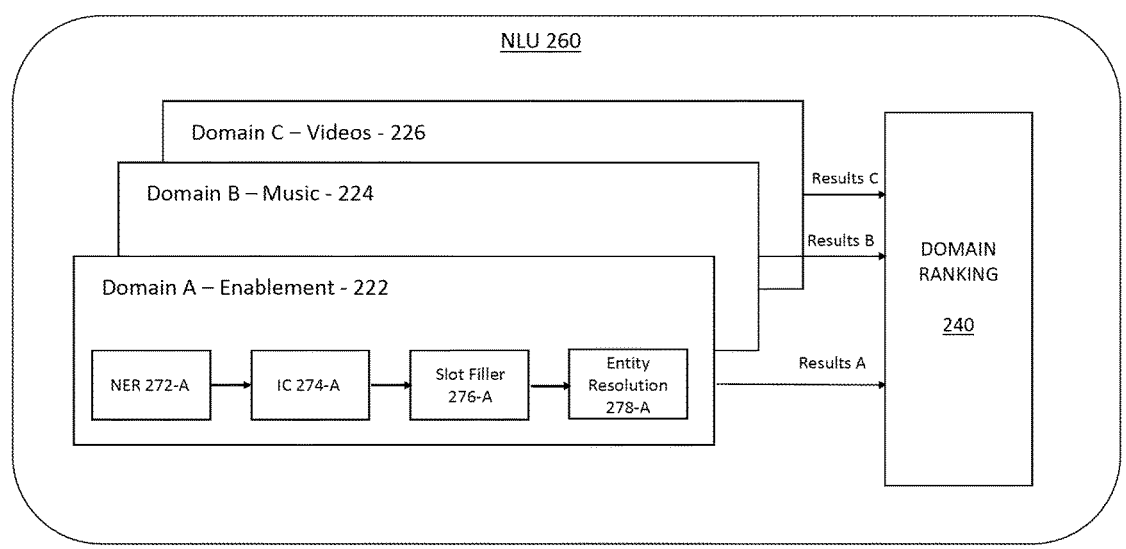
FIG. 2B is an illustrative diagram of a multi-domain architecture for an NLU system of FIG. 2A, in accordance with various embodiments.

FIG. 2B is an illustrative diagram of a multi-domain architecture for NLU system 260 of FIG. 2A, in accordance with various embodiments. In the multi-domain architecture of NLU system 260, each domain (which may include a set of intents and entity slots that define a larger concept such as music, books, etc.) may be constructed separately and be made available to NLU system 260 during runtime operations where natural language understanding functionality operations are performed on text (such as text output from ASR system 258). Each domain may have specially configured components to perform various steps of the NLU operations. For instance, each domain may include a component of NER system 272, IC system 274, Slot Filler system 276, and entity resolution system 278, which may be specific to that particular domain. Furthermore, a language model associated with a particular user account may specify various input and output characteristics of NLU system 260, which may vary from user to user based on that particular user's language model.

In the illustrative embodiment, an enablement domain 222 (Domain A) may have an NER component 272-A that identifies what slots, fields, or placeholders (i.e., portions of input text) may correspond to particular entities relevant to that domain. The NER component 272-A may use a machine learning model, such as a domain specific conditional random field ("CRF") to both identify the portions corresponding to an entity as well as identify what type of entity corresponds to the text portion. For example, for the text "Enable 'Skill 1'," an NER component 272-A trained for an enablement domain may recognize the portion of text (e.g., "enable") corresponds to an action. Enablement domain 222 may also have its own intent classification (IC) component 274-A that determines the intent of the text, assuming that the text is within the proscribed domain. IC components may use a model, such as a domain specific maximum entropy classifier, to identify the intent of the text. Enablement domain 222 may also have its own Slot Filler component 276-A that can apply rules or other instructions to standardize labels or tokens from previous stages into an intent/slot representation. The precise transformation may depend on the domain. For example, a travel domain may include a text mention of "<Location> airport," and may be transform the text mentioned to the standard three-letter code referring to that airport (e.g., ZZZ). Enablement domain 222 may also have its own Entity Resolution component 278-A that can refer to an authority source (such as a domain specific knowledge base) used to specifically identify the precise entity referred to in the entity mention identified in the incoming text. Specific intent/slot combinations may also be tied to a particular source, which may then be used to resolve the text (such as by providing information or a command to be executed in response to a user query). The output from Entity Resolution component 278-A may include a command, information, or other NLU result data indicating how the domain specific NLU processing handled the text and how the system should respond to the text, according to that specific domain.

As another example, a music domain 224 (Domain B) may have an NER component 272-B that identifies what slots (i.e., portions of input text) may correspond to particular entities relevant to that domain. For example, for the text "play songs by 'Artist 1'," an NER component trained for a music domain may recognize the portion of text (e.g., "Artist 1") corresponds to an entity and an artist name. Music domain 224 may also have its own intent classification (IC) component that determines the intent of the text, assuming that the text is within the proscribed domain. Music domain 224 may also have its own Slot Filler component that can apply rules or other instructions to standardize labels or tokens from previous stages into an intent/slot representation. Music domain 224 may also have its own Entity Resolution component that can refer to an authority source (such as a domain specific knowledge base) used to specifically identify the precise entity referred to in the entity mention identified in the incoming text. Specific intent/slot combinations may also be tied to a particular source, which may then be used to resolve the text (such as by providing information or a command to be executed in response to a user query). Using the example, "play songs by Artist 1," the source may be tied to a personal music catalog or the like.

The output from Entity Resolution component may include a command, information, or other NLU result data indicating how the domain specific NLU processing handled the text and how the system should respond to the text, according to that specific domain.

In some embodiments, the multiple domains of NLU system 260 of FIG. 2B may operate substantially in parallel, with different domain specific components. That is, shopping domain 222, may have its own NER component 272-A, IC module 274-A, Slot Filler component 276-A, and Entity Resolution component 278-A. Music domain 224 may also have similar components, and so on for the different domains available to the system. The same text that is input into the NLU pipeline for Shopping Domain 222 may also be input into the NLU pipeline for Music Domain 224, where the components for Music Domain 224 may operate on the text as if the text related to Music Domain 224, and so on for the different NLU pipelines for the different domains. Each domain specific NLU pipeline will create its own domain specific NLU results, for example Results A for Shopping Domain 222, Results B for Music Domain 224, Results C for Video Domain 226, and so on. The different results may then be input into a domain ranking component 240, which may ranks the different results for the different domains, and selects what the system believes to be the most applicable results given the input text and other factors. Those highest ranking results may then be used to execute a command, perform one or more actions, or obtain information responsive to a user query, or otherwise respond to the input text. NLU system 260 may include any number of domains related to any particular subject, and the three domains included in FIG. 2B (e.g., Shopping Domain 222, Music Domain 224, and Video Domain 226) are merely exemplary.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get Title" may refer to a request to purchase a book, play a movie, or play a soundtrack, but the multi-domain architecture and approach of NLU system 260 of FIG. 2B may result in only one such action being performed with any acknowledgement of ambiguity as the "Title" can refer to a book, movie, or soundtrack (or possibly all three).

In one embodiment, text data representing a response may be generated by language processing system 200. For instance, NLU system 260 and/or applications/skills system 262 may be employed to determine contextual features of a response to be generated, and may generate the corresponding text data representing that response. The text data may then be provided to TTS system 264, which may generate audio data representing the text data, which may then be sent to the requesting device.

Figure 3:
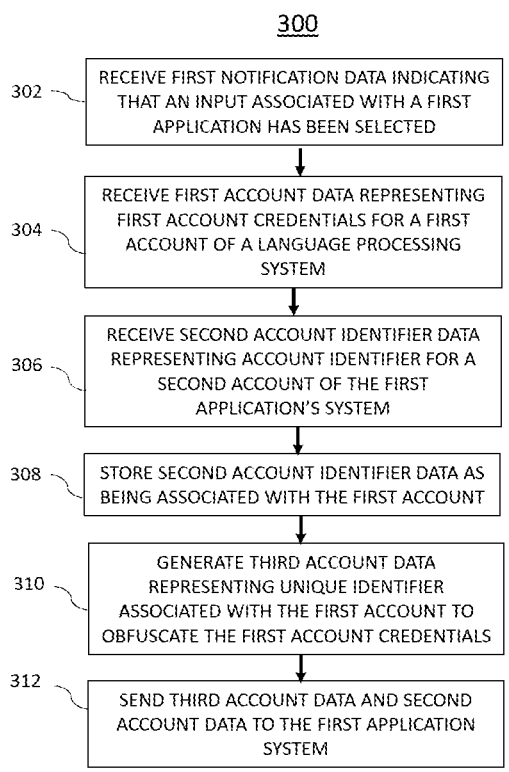
FIG. 3 is an illustrative flowchart of an exemplary process to obfuscate first account data associated with a language processing system, in accordance with various embodiments.

FIG. 3 is an illustrative flowchart of an exemplary process to obfuscate first account data associated with a language processing system, in accordance with various embodiments. Process 300 may, in a non-limiting embodiment, begin at step 302. At step 302, first notification data indicating that an input associated with a first application has been selected may be received. For example, in response to an individual pressing button 110, or selecting an option displayed on a display screen to connect a first account associated with a first application with a second account of a language processing system, notification data may be generated by electronic device 10, which may then be sent to language processing system 200. In one embodiment, the selection of button 110 may allow a first functionality associated with the first application to be enabled for the second account associated with language processing system 200, where the first functionality requires account information associated with a first account of the first application. For example, button 110 may allow pizza delivery service functionality to be enabled for an individual's account with language processing system 200. In this particular scenario, the pizza delivery service functionality requires the individual's pizza delivery service account information to allow an individual to use voice user interfaces for devices to facilitate interactions with the pizza delivery service using language processing system 200.

At step 304, first account data representing first account credentials for a language processing system may be received. For instance, in response to selecting button 110, second webpage 114 may be rendered by electronic device 10. Using second webpage 114, an individual may include account data 130 representing account credentials associated with an account for language processing system 200. In some embodiments, upon receipt of account data 130, language processing system 200 may attempt to "login" to the corresponding account. This may allow an individual to interact with language processing system 200 using electronic device 10 under the guise of that particular account. For instance, preferences, history, and other features associated with the particular account may now be accessible using electronic device 10. In some embodiments, if an individual is already logged into his/her account with language processing system 200 when button 110 is pressed, then first account identifier data representing a first account identifier associated with the first account may be received. The account identifier may, for example, correspond to a username, token, or any other suitable identifier that allows language processing system 200 to identify the notification data as being received from a device associated with a particular account of language processing system 200.

At step 306, second account identifier data representing an account identifier associated with a second account of the first application's system may be received. For example, an account identifier associated with a pizza delivery service account may be received. In some embodiments, an individual may "log-in" to their account with the first application, and their account data (e.g., account data 120) may be stored within memory by electronic device 10. In response to button 110 being selected, account identifier data 122 may be generated. Account identifier data 122 may be stored by the first application's backend system as being associated with the second account, and account identifier data 122 may also be sent to language processing system 200. Account identifier data 122 may also be stored as being associated with account data 130. In some embodiments, once the second account identifier data is received, a first language model data representing a first language model associated with first account may be determined. A more detailed description of determining a first model is located below in connection with step 404 of FIG. 4 and the same description applies herein.

Once second account identifier data is received, in some embodiments, a first application identifier associated with a first functionality of a language processing system that is associated with the first application may be received. As described above, a first application identifier may indicate which application the language processing system is capable of interacting with. Additionally, in some embodiments, the first application identifier may be stored as being associated with the first account.

In some embodiments, account identifier data 122 may be generated in response to selecting button 110. If not already logged into the account with the application, the individual may be prompted to enter in a username and password associated with their account for the first application. Once the log-in has been accomplished, the application's system may generate an identifier and/or token to represent the account data, and the application's system may store that identifier and/or token as being associated with the application's account. As another example, if the individual's account credentials have already been stored by memory of electronic device 10, the individual may be prompted to allow that account data to be sent to language processing system 200. For instance, an individual may be prompted with a message requesting that the individual authorize account data 120 being sent to language processing system 200, where the authorization may be in the form of a "Yes" or "No" option, a request to input a fingerprint into a fingerprint reader of electronic device 10, or using any other authorization technique. In some embodiments, the second account identifier data (e.g., account identifier data 122) may be sent to language processing system 200 with the first account data so as to allow language processing system 200 to identify the second account identifier data as being associated with the first account. Furthermore, in some embodiments, a first application identifier associated with the first application may also be sent to language processing system 200 to allow language processing system 200 to associate the second account identifier data with the first application's corresponding functionality with language processing system 200.

At step 308, the second account identifier data may be stored within memory (e.g., storage/memory 254 of accounts system 268) by language processing system 200 such that the second account data is stored as being associated with the first account. For instance, upon receipt of the first account data, electronic device 10 may be indicated as being associated with a first account of language processing system 200. Therefore, when the second account identifier data (as well as an application identifier associated with the first application) is received by language processing system 200, it may be stored as being associated with the first account. When audio data representing an utterance, or input text data, is received by language processing system 200, it may be processed and compared with various sample invocations and utterance templates corresponding to the first functionality associated with the first application. If an intent of the utterance is determined to be associated with one of the sample utterance templates, for example, then language processing system 200 may determine that the utterance is likely related to the first functionality. Therefore, the first application may be capable of being used to facilitate an action associated with the utterance's intent. Furthermore, because the first application may require the account credentials to perform the requested action, language processing system 200 may be capable of determining that the account that the request is associated with includes account data associated with the first application. Therefore, the account data may be sent to the first application to facilitate the request being processed. In some embodiments, once the first account data is stored as being associated with the second account, a second language model data representing an updated language model such that the first functionality is enabled for the first account may be generated. A more detailed description of an updated language model is located below in connection with step 414 of FIG. 4 and above in connection with the description of application/skills system 262 of FIG. 2A, both of the descriptions applying herein.

At step 310, third account data representing a unique identifier associated with the first account to obfuscate the first account credentials may be generated. For instance a simple object access protocol ("SOAP") token may be generated by language processing system 200 to allow data representing the first account credentials to be transferred to the first application's system securely such that the first application's system does not, in fact, store the first account data associated with the individual's account on language processing system 200, but instead stores the SOAP token. In some embodiments, the third account data may be a one-time generated obfuscated data structure representing the first account. Any suitable obfuscating technique may be employed, and the aforementioned is merely exemplary.

At step 312, the third account data and the second account identifier data may be sent to the first application's system to be stored. For instance, the third account data representing may be sent to first application system 140 along with the second account identifier data. This may allow first application system 140 to identify the request as being associated with the second account with the first application, and store the third account data as being associated with the second account. Therefore, future requests that are received from a device associated with the first account may then provide the third account data to the first application's system (e.g., first application system 140), which will be capable of identifying those requests as being associated with the second account.

As an illustrative example, upon successfully logging into both a first account associated with language processing system 200 and a second account associated with first application system 140, language processing system 200 may generate third account data representing a token that is unique to the first account. The second account data may correspond to an account identifier unique to the second account, which may be stored by first application system 140 as being associated with the second account. For instance, the second account data may correspond to account identifier representing the second account (e.g., a user name or an obfuscated identifier). When individual 2 speaks an utterance to voice activated electronic device 100, audio data representing the utterance may be sent from voice activated electronic device 100 to language processing system 200. Language processing system 200 may determine that an intent of the utterance is associated with first functionality associated with first application system 140. Therefore, because the audio data was received from electronic device 100 associated with the first account, language processing system 200 may identify the second account data stored as being associated with the first account, and may also identify the third account data representing the first account data stored as being associated with the first account and stored as being associated with the first application identifier. The intent, text data representing the audio data, and an application identifier, for example, may then be sent along with the masked data and the second account data to first application system 140. First application system 140, upon receipt of the masked data may determine that the masked identifier is associated with the second account, and because the second account data is also sent to first application system 140, may be capable of accessing the second account. The first application system may then be capable of processing the request for the second account based on the intent and text data.

Figure 4:
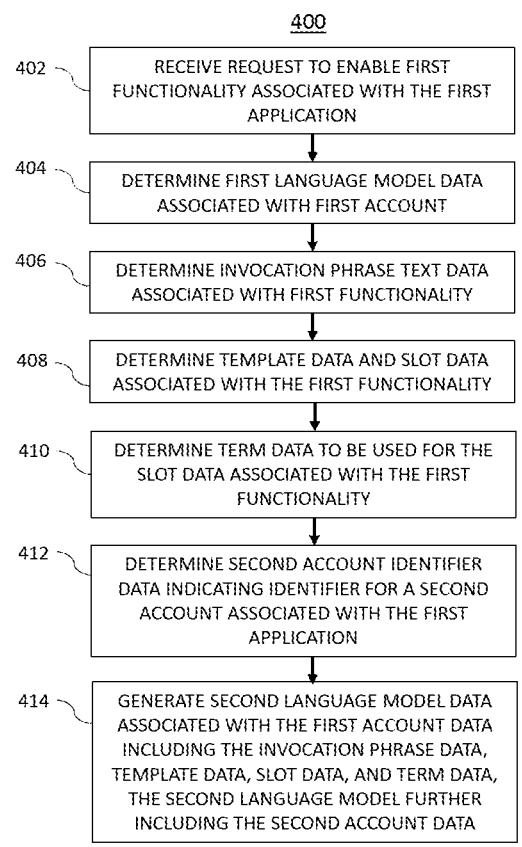
FIG. 4 is an illustrative flowchart of an exemplary process for updating a language model associated with a first account of a language processing system by adding functionality associated with a first application to the language model where the first application is associated with a second account, in accordance with various embodiments.

FIG. 4 is an illustrative flowchart of an exemplary process for updating a language model associated with a first account of a language processing system by adding functionality associated with a first application to the language model where the first application is associated with a second account, in accordance with various embodiments. Process 400 may, in one embodiment, begin at step 402. At step 402, a request to enable first functionality associated with a first application may be received. For example, the request may correspond to notification data received in response to selection of button 110. In some embodiments, the request may be received with first account identifier data representing a first account identifier associated with a first account of language processing system 200, and second account identifier data representing second account identifier associated with a second account of first application system 140. In some embodiments, the first functionality, to be enabled, may account information associated with the first application. For instance, in order to use language processing system 200 to facilitate spoken requests received by voice activated electronic device 100 that are associated with first application system 140, the first functionality associated with first application system 140 may need to be enabled for a first account with language processing system 200.

At step 404, first language model data representing a first language model associated with first account may be determined. The first language model data may indicate text data representing one or more of invocation phrases, sample utterances, sample responses, and/or slot values that may be used by language processing system 200 to understand inputs received thereby. For example, a language model for a first account may include sample utterance text data representing sample utterances associated with obtaining a weather forecast. When an individual speaks an utterance that substantially matches one of these sample utterances, language processing system 200 may be capable of identifying the intent as being associated with a particular application capable of providing the weather forecast, obtaining the weather forecast information from that application, and generating a response to the utterance (e.g., "The current forecast is . . . ").

At step 406, invocation phrase data associated with the first functionality may be determined. The invocation phrase text data may represent one or more invocation phrases that may be used to invoke the first functionality. If a subsequent utterance is determined to include one of these invocation phrases, then NLU system 260 may determine that the utterance is capable of being responded to using the first application. For example, a pizza delivery service's application may be associated with such invocation phrases "order," "place an order," and the like.

At step 408, template data and slot data associated with the first functionality may be determined. The template data may correspond to sample utterance template data, as well as sample response template data. Sample utterance template data, in one embodiment, may represent one or more sample utterances that individuals may speak that may be responded to using the first functionality. The sample utterance template may have such a format as, "{Invocation Phrase} {Object}," for example. Each sample utterance template may include one or more instances of slot data representing fillable slots/placeholders which may be "filled-in" by NLU system 260 after entity resolution system 278 identifies an entity to associate with that slot. The various sample utterance templates may each include slot data, which may correspond to a particular invocation phrase for the application. In this way, in response to determining that the first text data includes one of the invocation phrases, NLU system 260 may further determine which sample utterance template the invocation corresponds to. Sample response template data, in one embodiment, may represent one or more sample response templates capable of being used for formulating responses to utterances determined to be associated with the first functionality. The sample response templates may correspond to various sentence structures or formats that may be used to respond to an invocation that is to be serviced by the first application. The sample response template(s) may include slot data representing one or more slots that may be "filled-in" with one or more slot values. The slot data may be also be determined, where the slot data represents the fillable slots within the sample utterance and sample response template data that are capable of being attributed with values depending on the text data and intent.

At step 410, term data to be used for the slot data that is associated with the first functionality may be determined. The term data may represent terms or values that are associated with the first functionality and that may be used attributed to particular slot data. At step 412, second account identifier data associated with the first application may be determined. The second account data may represent a second account identifier associated with a second account of the first application that the first account of language processing system 200 is associated with. For example, the second account identifier data may include a username, token, and/or any other suitable identifier, associated with the second account of the first application.

At step 414, second language model data associated with the first account data may be generated. The second language model data may include the first language model data having the invocation phrase text data, the template data, the slot data, and the term data added. Furthermore, the second language model may include the second account data stored as being associated with the first account such that when the first functionality is invoked using the second language model data, the second account data is capable of being provided to the first application to facilitate an action/response being provided.

Figure 5:
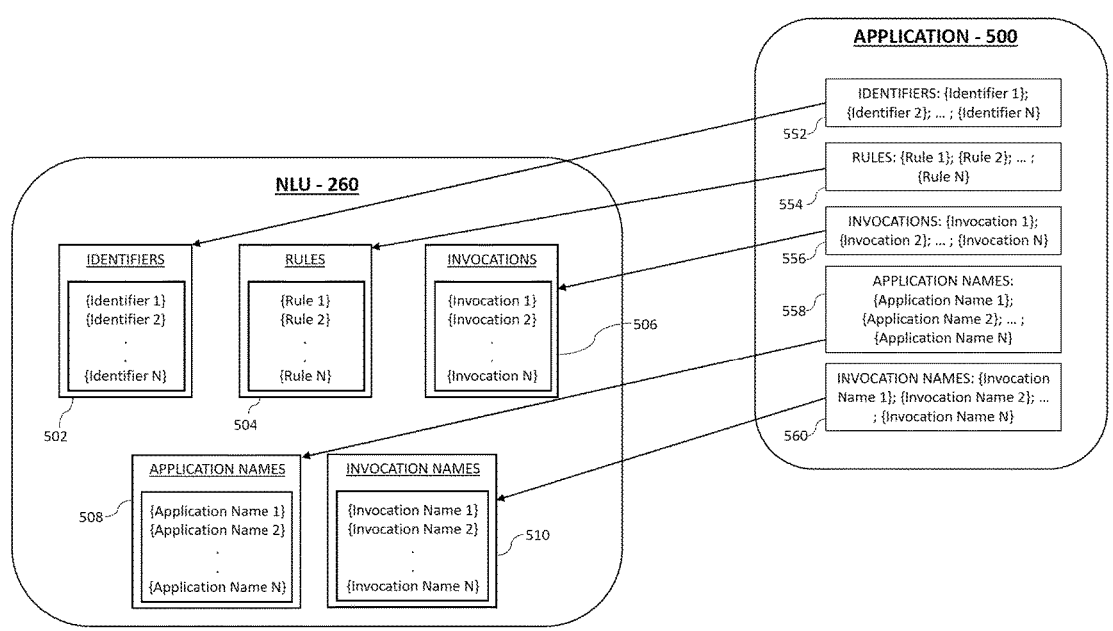
FIG. 5 is an illustrative diagram of an exemplary system describing a language model being updated to include functionality associated with a first application, in accordance with various embodiments.

FIG. 5 is an illustrative diagram of an exemplary system describing a language model being updated to include functionality associated with a first application, in accordance with various embodiments. When a new functionality associated with a new application is available for use by language processing system 200, that application may provide NLU module 260 with various keywords and sentence frameworks for updating a current language model for a user account of language processing system 200. Those keywords and sentence frameworks may be compared against text outputs from ASR module 258. If one or more of the text outputs match, to a certain confidence level, one of the sentence frameworks, or include one of the keywords, then that particular application corresponding to those keywords and/or sentence frameworks may be queried to perform an action and/or generate a response.

As one illustrative, non-limiting embodiment, an application 500 (e.g., first application system 140) may include one or more identifiers 552, rules 554, invocations 556, application names 558, and invocation names 560. Identifiers 552, in the illustrative embodiment, may include {Identifier 1}, {Identifier 2}, {Identifier 3} and so on, which each correspond to one or more words that, if determined to be included within a text output from ASR module 258, may signify that application 500 may be used to service the query. For example, if application 500 corresponds to a weather application, then some exemplary identifiers may be: {Identifier 1}: Weather; {Identifier 2}: Forecast; {Identifier 3}: Rain, etc. Therefore, if an utterance made by an individual to their voice activated electronic device includes the question, "What is the weather?", NLU module 260 may recognize that the text of the utterance includes an instance of {Identifier 1}: Weather, and may call application 500 to handle responding to the utterance.

Rules 554, in the illustrative embodiment, may include {Rule 1}, {Rule 2}, {Rule 3} and so on, which each may correspond to one or more actions that may be performed in response to NLU module 260 requesting that application 500 handle a particular query. As one example, if the utterance was inquiring about the current weather conditions, one or more rules 554 may cause application 500 to obtain a current weather forecast for a geographic location associated with an IP address of the requesting device. Rules 554 may further cause one or more actions to be performed by the requesting device or by an additional device. For example, rules 554 may cause content to be output on a particular device based on the received utterance.

Invocations 556 may, in one embodiment, include various invocation frameworks, {Invocation 1}, {Invocation 2}, {Invocation 3}, which correspond to sample sentence structures associated with different invocations. For example, an invocation to enable application 500 may have the format, "{Identifier 1} {Application Name 1}," or "{Identifier 2} {Invocation Name 1}," and so on. When NLU module 260 receives the text outputs from ASR module 258, the text outputs may be compared against the various invocation frameworks to determine which invocation framework is a most probable match. In some embodiments, NLU system 260 may first identify an enablement intent as one of the identifiers 552, and then based on the enablement identifier, may refine the search of invocations 556 to only search for invocations including the specific enablement intent. For example, if {Identifier 1} is "Order," then invocations 556 including an order item identifier therein may be used to determine which invocation is most likely to match the text output.

Application names 558 and invocation names 560 may both correspond to names that may be used to invoke a particular application. For example, an application name may be associated with a particular application's title (e.g., "Weather," "Traffic," "Skill 1," "Sample Pizza," etc.), whereas an invocation name may be associated with the application's title as well as one or more additional words. For instance, an invocation name for a weather application titled, "Weather," may have an invocation name, "Weather Application," or "My Weather Application." Similarly, an invocation for an application titled, "TV Show Trivia," may have an invocation name, "TV Show Fan Trivia" or "TV Show Fan Trivia Application." In some embodiments, however, NLU system 260 may be flexible, and capable of determining a most likely application associated with the utterance. For example, if the utterance is "What is the weather?", NLU system 260 may be capable of determining that the utterance includes the word, "weather", and therefore may determine an application that may be used for responding to the utterance.

In some embodiments, each application included within applications/system 262 may provide NLU module 260 with data representing the various Identifiers 552, Rules 554, Invocations 556, Application names 558, and Invocation names 560 associated with a particular application's functionality. NLU system 260 may, therefore, store the data representing the various identifiers, rules, invocations, application names, and invocation names, for each application within an identifier database 502, rules database 504, invocations database 506, application names database 508, and invocation names database 510, respectively. Thus, each time ASR module 258 generates text data based on received audio data representing an utterance, NLU system 260 may use the propagated fields of identifier database 502, rules database 504, invocations database 506, application names database 508, and invocation names database 510 to determine a most likely application or applications that may handle responding to the query, and may cause one or more of those applications to obtain response information for the query and/or perform one or more actions.

Figure 6:
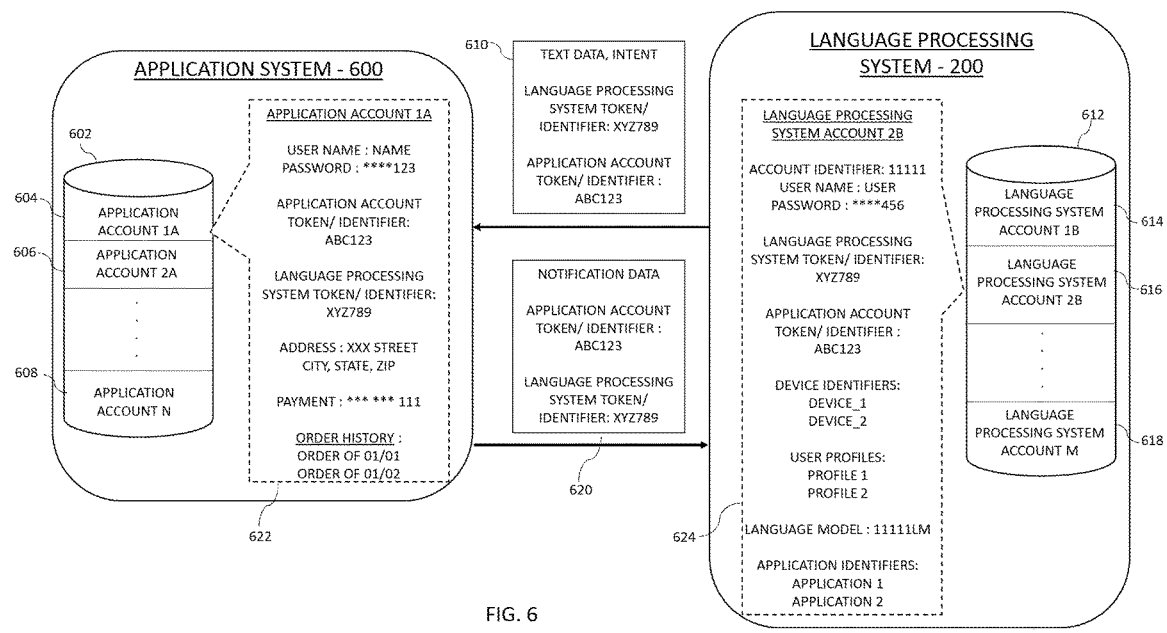
FIG. 6 is an illustrative diagram of an exemplary system describing updating account data associated with a language processing system and account data associated with an application system in response to receiving audio data having an intent associated with the first application system, in accordance with various embodiments.

FIG. 6 is an illustrative diagram of an exemplary system describing updating account data associated with a language processing system and account data associated with an application system in response to receiving audio data having an intent associated with the first application system, in accordance with various embodiments. In a non-limiting example embodiment, application system 600 may include an account database 602. Account database 602 may be configured to store account data associated with various accounts of application system 600. For instance, account database 602 may include a first account 604—Application Account 1A, a second account 606—Application Account 2A, up to an n-th account 608—Application Account N.

Each application account stored by account database 602 may store account data representing one or more pieces of account information associated with that particular account of application system 600. For example, first account 604—Application Account 1A—may store account data 622 representing account information associated with first account 604. Account data 622 may include such information as a username and password for first account 604, an application token/identifier for first account 604, a token/identifier of an account of language processing system 200 that first account 604 is associated with, an address associated with first account 604, payment information associated with first account 604, and/or order history associated with first account 604. Additional information associated with first account 604 may be included within account data 622 and/or some of the described information may not be included for each account stored by account database 602, and the aforementioned is merely exemplary.

In some embodiments, as described previously, language processing system 200 may also include an accounts database 612. Account database 612 may be configured to store account data associated with various accounts of language processing system 200. For instance, account database 612 may include a first account 614—Language Processing System Account 1B, a second account 616—Language Processing System Account 2B, up to an m-th account 618—Language Processing System Account M.

Each language processing system account stored by account database 612 may store account data representing one or more pieces of account information associated with that particular account of language processing system 200. For example, second account 616—Language Processing System Account 2B—may store account data 624 representing account information associated with second account 616. In some embodiments, account data 624 may include such account information as an account identifier associated with second account 616, a user name and password associated with second account 616, a language processing system token/identifier associated with second account 616, one or more application tokens/identifiers associated applications that second account 616 is capable of interacting with using language processing system 200, one or more device identifiers corresponding to devices associated with second account 616, one or more user profiles associated with second account 616, language model data indicating a language model associated with second account 616, and/or one or more application identifiers indicating applications whose functionalities are enabled for second account 616. Additional information associated with second account 616 may be included within account data 624 and/or some of the described information may not be included for each account stored by account database 612, and the aforementioned is merely exemplary.

As described in greater detail above, in response to receiving an input (e.g., button 110) to connect/link accounts of language processing system 200 and an application's system (e.g., application system 600), notification data 620 including application account identifier data may be sent from application system 600 to language processing system 200 along with a language processing system account identifier (e.g., account identifier 11111). Upon receipt, language processing system 200 may determine that the account identifier is associated with language processing system account 616, and may store the application account identifier (e.g., application token/identifier ABC123) as being associated with language processing system account 616 within accounts database 612. Furthermore, language processing system 200 may also store an application identifier (e.g., "Application 1") with the application account identifier as being associated with language processing system account 616.

When language processing system 200 receives audio data representing an utterance, such as utterance 4, orchestrator 250 may provide the audio data to ASR system 258 to generate text data representing the utterance. After the text data is generated, NLU system 260 may determine an intent of utterance 4 using the text data. For example, NLU system 260 may determine that the intent is associated with a functionality capable of being facilitated by application system 600 (e.g., ordering a pizza, ordering a car service, etc.). Upon determining the application system to service the intent, language processing system 200 may generate, if not generated already, a unique token/identifier representing second account 616 (e.g., language processing system token/identifier XYZ789). Language processing system 200 may then send a data packet 610 including the text data, the intent, account identifier data representing the token/identifier associated with second account 616, and account identifier data representing the application account token/identifier (e.g., application account token/identifier ABC123) to application system 600.

Upon receiving data packet 610, application system 600 may store the account identifier data representing the token/identifier associated with second account 616 as being associated with application account 604. This may allow language processing system account 616 to be "linked" with application account 604. Future requests received by language processing system 200 that are directed to a functionality associated with application system 600 may then only need to send the request (e.g., text data and intent) and the language processing system token/identifier, which may allow application system 600 to determine the application account associated with the incoming request.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
   receiving, at a language processing system, a first application identifier indicating a first application functionality associated with the language processing system, the first application identifier being received from a first electronic device in response to a button displayed by a display screen associated with the first electronic device being pressed, the first application identifier being received from the first electronic device;
   receiving, at the language processing system, a first account identifier associated with a first account of a first application system, the first application system corresponding to the first functionality of the language processing system, the first account identifier being received from the first electronic device;
   receiving, at the language processing system, a second account identifier associated with a second account of the language processing system, the second account identifier being received from the first electronic device;
   determining, based at least in part on the second account identifier, that the first electronic device is associated with the second account;
   storing the first account identifier as being associated with the second account;
   determining, using the first application identifier, the first application functionality associated with the language processing system; and
   causing the first application functionality to be enabled for the second account such that a language model associated with the second account is updated to comprise:
      first application invocation phrase text data representing invocation phrases capable of being used to invoke the first application functionality;
      first application sample utterance template text data representing sample utterances having an intent associated with the first application functionality;
      first application sample response template text data representing sample responses capable of being used to respond to subsequent utterance associated with the first application functionality, the first application sample response template text data comprising first application response slot data; and
      first application placeholder value text data capable of being used for the first application response slot data.

2. The method of claim 1, further comprising:
   receiving, at the language processing system, first audio data representing a first utterance, the first utterance comprising a request associated with the first application system, the first audio data being received from the first electronic device;
   generating first text data representing the first audio data;
   determining a first confidence score indicating a likelihood that the first utterance corresponds to one of the sample utterances;
   determining that the first confidence score is greater than a predefined confidence score threshold indicating that a first intent of the first utterance is associated with the first application functionality;
   sending the second account identifier to the first application system to identify the second account identifier as being associated with the first account;
   sending the first text data to the first application system such that the request is capable of being facilitated;
   receiving, at the language processing system and from the first application system, notification data indicating that the request has been processed;
   determining second text data representing a message indicating that the request has been processed by the first application system;
   generating second audio data representing the second text data; and
   sending the second audio data to the first electronic device.

3. The method of claim 1, further comprising:
   generating third account data representing an account token associated with the second account;
   storing the third account data as being associated with the second account such that the third account data is stored as being associated with the first application identifier and the first account identifier;
   receiving, at the language processing system, first audio data representing a first utterance, the first utterance comprising a request associated with the first application system, the first audio data being received from the first electronic device;
   generating first text data representing the first audio data;
   determining, using the first text data, that a first intent of the first utterance is associated with the first application functionality;
   sending the first account identifier and the third account data to the first application system to such that the first application system authorizes the first account as being associated with an obfuscated account of the language processing system, the obfuscated account corresponding to the second account;
   sending the first text data to the first application system such that the request is capable of being facilitated.

4. The method of claim 1, further comprising:
   sending the first account identifier to the first application system; and
   sending the second account identifier to the first application system such that the first application system stores the second account identifier as being associated with the first account to authorize the second account with the first application system.

5. A method, comprising:
   receiving, from a first device, first account data representing a first account identifier associated with a first account of a first application;
   receiving a first application identifier associated with a first functionality of a language processing system that is associated with the first application;
   receiving second account data representing a second account identifier;

determining that the second account identifier is associated with a second account of the language processing system;
determining first language model data representing a language model associated with the second account;
storing the first account data as being associated with the second account;
storing the first application identifier as being associated with the second account; and
generating second language model data representing an updated language model such that the first functionality is enabled for the second account.

6. The method of claim 5, further comprising:
receiving first notification data indicating that a first button associated with the first application has been invoked by the first device, wherein the first button is displayed within a webpage rendered by the first device such that the first account data and the second account data are received in response to the first button being invoked.

7. The method of claim 5, further comprising:
adding the first functionality to the first language model data to generate the second language model data, wherein adding the first functionality comprises:
adding, to the first language model data, first text data representing at least one phrase capable of being used to invoke the first functionality;
adding, to the first language model data, second text data representing at least one response capable of being used to respond to the at least one phrase, the second text data comprising slot data representing at least one fillable slot; and
adding, to the first language model data, third text data representing at least one term associated with the first functionality that is capable of being attributed to the slot data.

8. The method of claim 5, further comprising:
sending the second account data to the first application; and
sending the first account data to the first application such that the second account data is stored by the first application as being associated with the first account.

9. The method of claim 5, further comprising:
receiving, from the first device, first audio data representing a first utterance;
generating first text data representing the first audio data;
determining, using the first text data, that a first intent of the first utterance is associated with the first functionality;
sending the first text data to the first application;
sending the second account data to the first application; and
sending the first account data to the first application such that the second account data is stored by the first application as being associated with the first account.

10. The method of claim 9, further comprising:
receiving notification data indicating that an action associated with the first intent has been performed by the first application;
determining, using the second language model data, second text data representing a response indicating that the action has been performed;
generating second audio data representing the second text data; and
sending the second audio data to the first device.

11. The method of claim 5, further comprising:
generating third account data representing the second account data, the third account data comprising a token associated with the second account identifier; and
storing the third account data as being associated with the second account and the first account data such that an utterance having an intent associated with the first functionality causes the third account data to be sent to the first application to identify the second account as being associated with the first account.

12. The method of claim 11, further comprising:
receiving, from the first device, first audio data representing a first utterance;
generating first text data representing the first audio data;
determining, using the first text data, that a first intent of the first utterance is associated with the first functionality;
determining that the second account comprises the third account data as being associated with the first functionality;
sending the first text data to the first application;
sending the third account data to the first application; and
sending the first account data to the first application such that the third account data is stored by the first application to associate the second account with the first account.

13. A language processing system, comprising:
memory;
communications circuitry; and
at least one processor operable to:
receive, from a first device, first account data representing a first account identifier associated with a first account of a first application;
receive a first application identifier associated with a first functionality of a language processing system that is associated with the first application;
receive second account data representing a second account identifier;
determine that the second account identifier is associated with a second account of the language processing system;
determine first language model data representing a language model associated with the second account;
store the first account data as being associated with the second account;
store the first application identifier as being associated with the second account; and
generate second language model data representing an updated language model such that the first functionality is enabled for the second account.

14. The language processing system of claim 13, wherein the at least one processor is further operable to:
receive first notification data indicating that a first button associated with the first application has been invoked by the first device, wherein the first button is displayed within a webpage rendered by the first device such that the first account data and the second account data are received in response to the first button being invoked.

15. The language processing system of claim 13, wherein the at least one processor is further operable to:
add the first functionality to the first language model data to generate the second language model data, wherein the first functionality being added comprises:
first text data representing at least one phrase capable of being used to invoke the first functionality being added to the first language model data;
second text data representing at least one response capable of being used to respond to the at least one phrase, the second text data comprising slot data representing at least one fillable slot being added to the first language model data; and third text data representing at least one term associated with the first functionality that is capable of being attributed to the slot data being added to the first language model data.

16. The language processing system of claim 13, wherein the at least one processor is further operable to:

send the second account data to the first application; and send the first account data to the first application such that the second account data is stored by the first application as being associated with the first account.

17. The language processing system of claim 13, wherein the at least one processor is further operable to:

receive, from the first device, first audio data representing a first utterance;

generate first text data representing the first audio data;

determine, using the first text data, that a first intent of the first utterance is associated with the first functionality;

send the first text data to the first application;

send the second account data to the first application; and send the first account data to the first application such that the second account data is stored by the first application as being associated with the first account.

18. The language processing system of claim 17, wherein the at least one processor is further operable to:

receive notification data indicating that an action associated with the first intent has been performed by the first application;

determine, using the second language model data, second text data representing a response indicating that the action has been performed;

generate second audio data representing the second text data; and send the second audio data to the first device.

19. The language processing system of claim 13, wherein the at least one processor is further operable to:

generate third account data representing the second account data, the third account data comprising a token associated with the second account identifier; and store the third account data as being associated with the second account and the first account data such that an utterance having an intent associated with the first functionality causes the third account data to be sent to the first application to identify the second account as being associated with the first account.

20. The language processing system of claim 13, wherein the at least one processor is further operable to:

receive, from the first device, first audio data representing a first utterance;

generate first text data representing the first audio data;

determine, using the first text data, that a first intent of the first utterance is associated with the first functionality;

determine that the second account comprises the third account data as being associated with the first functionality;

send the first text data to the first application;

send the third account data to the first application; and send the first account data to the first application such that the third account data is stored by the first application to associate the second account with the first account.

\* \* \* \* \*